United States Patent
Kim et al.

(10) Patent No.: US 10,505,608 B2
(45) Date of Patent: Dec. 10, 2019

(54) METHOD FOR FEEDING BACK CSI INFORMATION IN WIRELESS COMMUNICATION SYSTEM, AND APPARATUS THEREFOR

(71) Applicant: LG ELECTRONICS INC., Seoul (KR)

(72) Inventors: Heejin Kim, Seoul (KR); Jiwon Kang, Seoul (KR); Kitae Kim, Seoul (KR); Kilbom Lee, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/553,967

(22) PCT Filed: Jul. 23, 2015

(86) PCT No.: PCT/KR2015/007686
§ 371 (c)(1),
(2) Date: Aug. 25, 2017

(87) PCT Pub. No.: WO2016/137061
PCT Pub. Date: Sep. 1, 2016

(65) Prior Publication Data
US 2018/0034523 A1    Feb. 1, 2018

Related U.S. Application Data

(60) Provisional application No. 62/120,891, filed on Feb. 26, 2015.

(51) Int. Cl.
*H04W 72/04* (2009.01)
*H04B 7/06* (2006.01)
(Continued)

(52) U.S. Cl.
CPC ......... *H04B 7/0617* (2013.01); *H04B 7/0478* (2013.01); *H04B 7/0626* (2013.01);
(Continued)

(58) Field of Classification Search
CPC .... H04B 7/0632; H04B 7/0634; H04B 7/066; H04B 7/0663; H04B 7/0626; H04B 7/0628; H04B 7/0639; H04B 7/0478
See application file for complete search history.

(56) References Cited

U.S. PATENT DOCUMENTS

2009/0154588 A1* 6/2009 Chen .................... H04L 1/0026
375/267
2012/0063500 A1* 3/2012 Wang .................... H04L 1/0026
375/224
(Continued)

FOREIGN PATENT DOCUMENTS

JP    2014053811    3/2014
WO    2014168323    10/2014

OTHER PUBLICATIONS

PCT International Application No. PCT/KR2015/007686, Written Opinion of the International Searching Authority dated Dec. 17, 2015, 16 pages.
(Continued)

*Primary Examiner* — Hassan Kizou
*Assistant Examiner* — Mahbubul Bar Chowdhury
(74) *Attorney, Agent, or Firm* — Lee Hong Degerman Kang & Waimey

(57) ABSTRACT

The present application provides a method for feeding back, by a terminal, CSI information in a wireless communication system to which 3D beamforming is applied. Here, the method comprises the steps of: receiving a pilot signal from a base station; and feeding back first CSI information for a horizontal direction domain and second CSI information for
(Continued)

a vertical direction domain on the basis of the 3D beamforming. Here, when a precoding indicator is a first value, first wideband (WB) CSI information and second wideband (WB) CSI information may be fed back, and when the precoding indicator is a second value, first subband (SB) CSI information and second subband (SB) CSI information may be fed back.

10 Claims, 24 Drawing Sheets

(51) Int. Cl.
 *H04L 5/00* (2006.01)
 *H04B 7/0456* (2017.01)
 *H04B 7/024* (2017.01)
(52) U.S. Cl.
 CPC ......... *H04B 7/0639* (2013.01); *H04L 5/0048* (2013.01); *H04B 7/024* (2013.01); *H04B 7/0469* (2013.01); *H04B 7/0486* (2013.01)

(56) References Cited

U.S. PATENT DOCUMENTS

| | | | | |
|---|---|---|---|---|
| 2013/0094479 A1* | 4/2013 | Park | ...................... | H04L 5/0057 370/336 |
| 2013/0258897 A1* | 10/2013 | Park | ...................... | H04B 7/0626 370/252 |
| 2013/0308715 A1 | 11/2013 | Nam et al. | | |
| 2013/0336214 A1* | 12/2013 | Sayana | ................... | H04B 7/024 370/328 |
| 2014/0003240 A1* | 1/2014 | Chen | ...................... | H04W 28/08 370/235 |
| 2014/0098689 A1* | 4/2014 | Lee | ...................... | H04B 7/0469 370/252 |
| 2015/0043673 A1* | 2/2015 | Lee | ...................... | H04B 7/0469 375/267 |
| 2015/0078472 A1* | 3/2015 | Vook | ................... | H04B 7/0617 375/267 |
| 2015/0222335 A1* | 8/2015 | Jing | ...................... | H04B 7/0469 375/267 |
| 2015/0222340 A1* | 8/2015 | Nagata | ................... | H04W 16/28 375/267 |
| 2015/0280801 A1* | 10/2015 | Xin | ...................... | H04B 7/0478 370/329 |
| 2016/0204842 A1* | 7/2016 | Song | ................... | H04L 1/0029 375/267 |
| 2016/0269089 A1* | 9/2016 | Liu | ...................... | H04B 7/0626 |
| 2017/0180029 A1* | 6/2017 | Chen | ................... | H04B 7/0469 |

OTHER PUBLICATIONS

LG Electronics, "Discussion on CSI-RS design enhancements", 3GPP TSG RAN WG1 Meeting #80, R1-150223, Feb. 2015, 7 pages.
Alcatel-Lucent, "Considerations on CSI feedback enhancements for high-priority antenna configurations", 3GPP TSG RAN WG1 Meeting #66, R1-112420, Aug. 2011, 7 pages.

* cited by examiner

FIG. 2
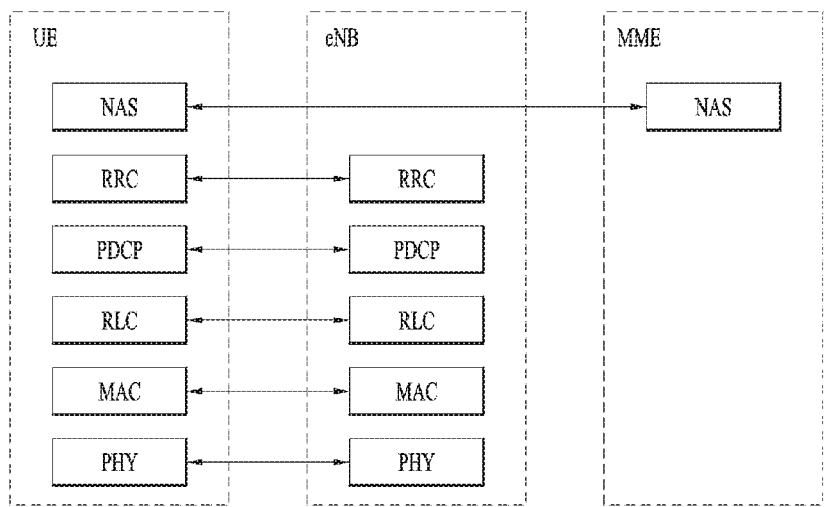
(a) Control-Plane Protocol Stack
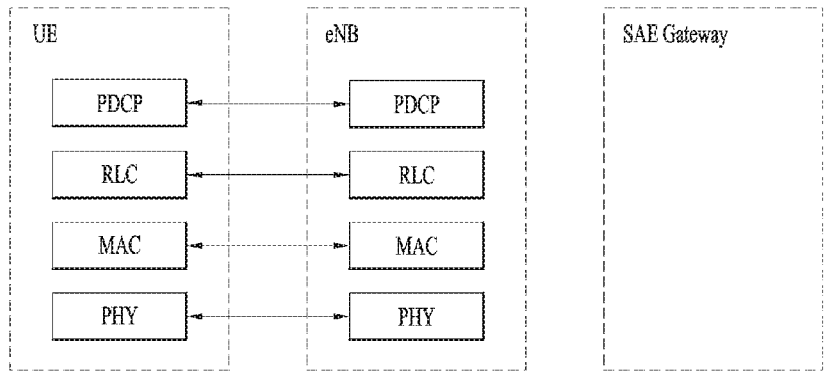
(b) User-Plane Protocol Stack (a) CONVENTIONAL ANTENNA SYSTEM          (b) AAS

METHOD FOR FEEDING BACK CSI INFORMATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2015/007686, filed on Jul. 23, 2015, which claims the benefit of U.S. Provisional Application No. 62/120,891, filed on Feb. 26, 2015, the contents of which are all hereby incorporated by reference herein in their entirety.

TECHNICAL FIELD

The present invention relates to a wireless communication system and, more particularly, to a method of feeding back channel state information (CSI) in a wireless communication system, to which 3D beamforming is applied, and a device therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention is to provide a method of feeding back channel state information (CSI) in a wireless communication system and a device therefor.

Another object of the present invention is to provide a method of feeding back CSI based on a vertical domain and a horizontal domain when 3D beamforming is applied to a wireless communication system.

Another object of the present invention is to provide a method of feeding back CSI based on information indicated by an indicator when 3D beamforming is applied to a wireless communication system.

Technical Solution

The object of the present invention can be achieved by providing a method of, at a user equipment (UE), feeding back channel state information (CSI) in a wireless communication system, to which three-dimensional (3D) beamforming is applied, including receiving a pilot signal (reference signal) from a base station and feeding back first CSI for a horizontal domain and second CSI for a vertical domain based on 3D beamforming, wherein, if a precoding indicator is a first value, wideband (WB) first CSI and wideband (WB) second CSI are fed back, and wherein, if the precoding indicator is a second value, subband (SB) first CSI and subband (SB) second CSI are fed back.

In another aspect of the present invention, provided herein is a user equipment (UE) device for feeding back channel state information (CSI) in a wireless communication system, to which three-dimensional (3D) beamforming is applied, including a reception module configured to receive information from an external device, a transmission module configured to transmit information to an external device, and a processor configured to control the reception module and the transmission module, wherein the processor receives a pilot signal (reference signal) from a base station using the reception module, and feeds back first CSI for a horizontal domain and second CSI for a vertical domain based on 3D beamforming using the transmission module, wherein, if a precoding indicator is a first value, wideband (WB) first CSI and wideband (WB) second CSI are fed back, and wherein, if the precoding indicator is a second value, subband (SB) first CSI and subband (SB) second CSI are fed back.

In addition, the following matters are commonly applicable to the method of feeding back the CSI and the UE device in the wireless communication system.

In one embodiment of the present invention, the WB first CSI and the WB second CSI may be fed back earlier than the SB first CSI and the SB second CSI.

In one embodiment of the present invention, the precoding indicator may have 1 bit.

In one embodiment of the present invention, the CSI may include a vertical (V)-precoding matrix index (PMI) and a horizontal (H)-PMI, and the V-PMI and the H-PMI may be configured based on a dual codebook.

In one embodiment of the present invention, if the precoding indicator is a first value, WB V-PMI (WB W1-V) and WB first H-PMI (WB W1-H) may be fed back in a first subframe, and WB second H-PMI (WB W2-H) and WB second V-PMI (WB W2-V) may be sequentially fed back in a second subframe and a third subframe, respectively.

In one embodiment of the present invention, the first subframe, the second subframe and the third subframe may be consecutive in terms of time.

In one embodiment of the present invention, feedback periods of the precoding indicator, WB W1-V, WB W1-H, WB W2-V and WB W2-H may be differently set.

In one embodiment of the present invention, if the precoding indicator is a first value, WB first H-PMI (WB W1-H) and WB first V-PMI (WB W1-V) may be sequentially fed back in a first subframe and a second subframe, respectively, and WB second H-PMI (WB W2-H) and WB second V-PMI (WB W2-V) may be fed back along with a CQI corresponding to each subframe in a third subframe and a fourth subframe, respectively.

In one embodiment of the present invention, if the precoding indicator is a second value, SB first CSI for the horizontal domain may be fed back in a first part, SB second CSI for the vertical domain may be fed back in a second part, and the first part and the second part may be divided in terms of time.

In one embodiment of the present invention, if the precoding indicator is a second value, the CSI may be sequentially fed back per bandwidth part. At this time, the bandwidth part may include two subframes respectively including the SB first CSI and SB second CSI.

In one embodiment of the present invention, the CSI may include a vertical (V)-precoding matrix index (PMI) and a horizontal (H)-PMI. At this time, at least one of the V-PMI and the H-PMI may be configured based on a single codebook.

If any one of the V-PMI and the H-PMI is configured based on the single codebook, SB PMI feedback for a PMI configured in the single codebook may be omitted.

In one embodiment of the present invention, if the V-PMI and the H-PMI are both configured based on the single codebook, SB PMI feedback for the V-PMI and the H-PMI may be omitted.

In one embodiment of the present invention, if the precoding indicator may have 2 bits, the first value of the precoding indicator may include a 1-H value indicating that the WB first CSI is fed back and a 1-V value indicating that the WB second CSI is fed back, and the second value of the precoding indicator may include a 2-H value indicating that the SB first CSI is fed back and a 2-V value indicating that the SB second CSI is fed back.

Advantageous Effects

According to the present invention, it is possible to provide a method of feeding back CSI in a wireless communication system and a device therefor.

According to the present invention, it is possible to provide a method of feeding back CSI based on a vertical domain and a horizontal domain when 3D beamforming is applied to a wireless communication system.

According to the present invention, it is possible to provide a method of configuring a CSI feedback mode and included information when 3D beamforming is applied to a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN);

BEST MODE

Figure 1:
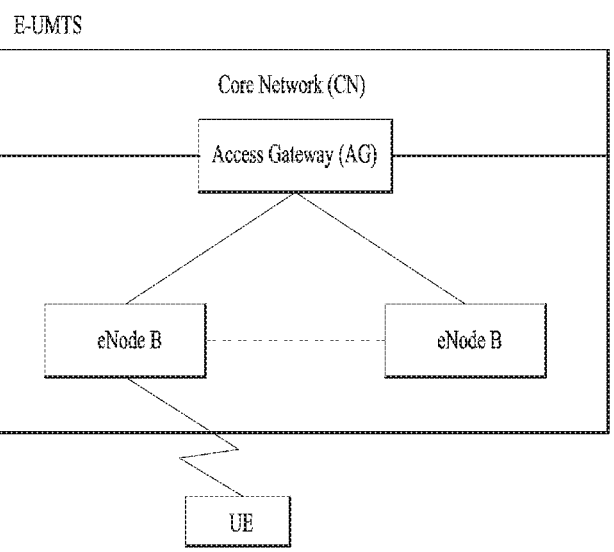
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
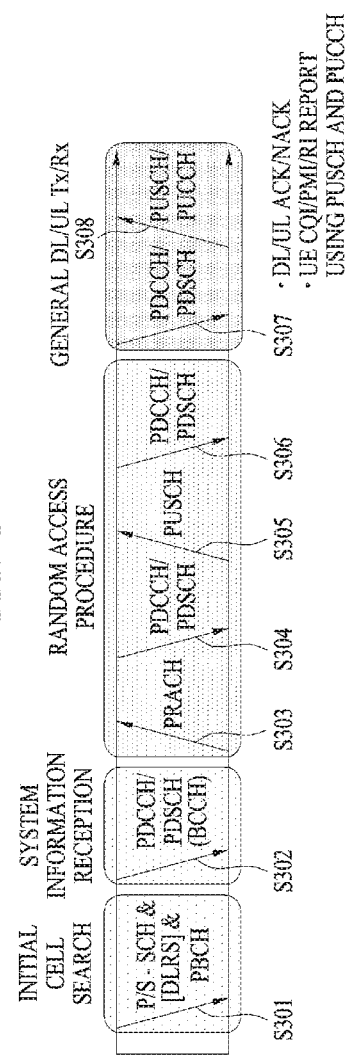
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
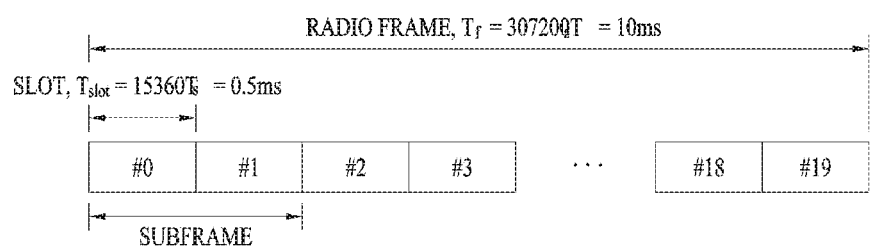
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
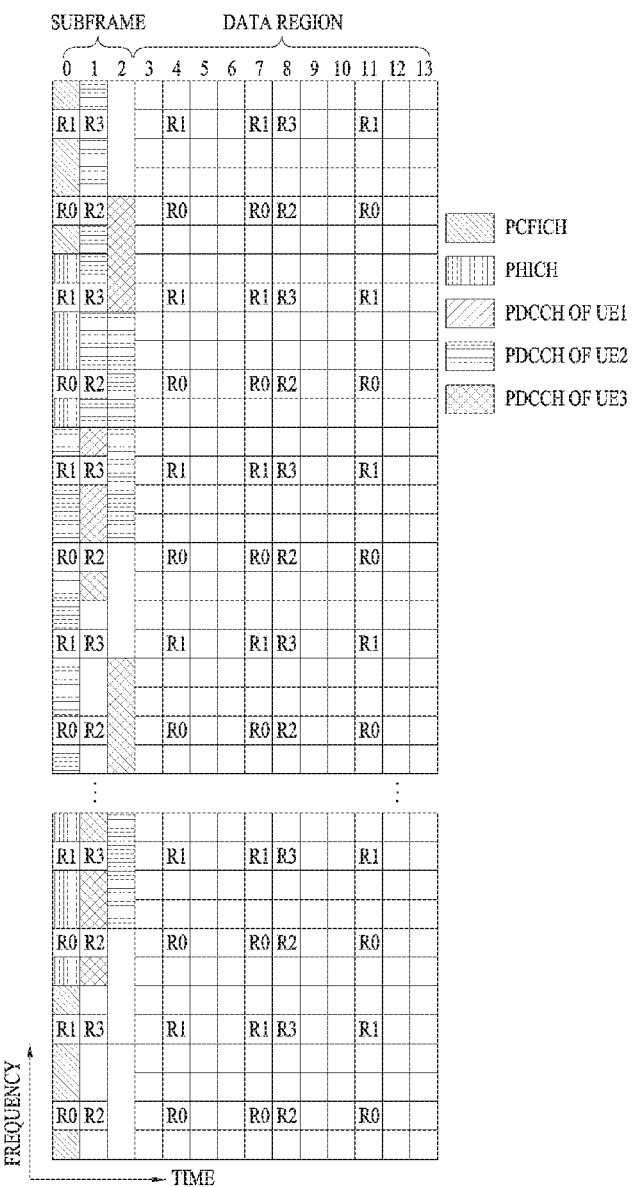
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
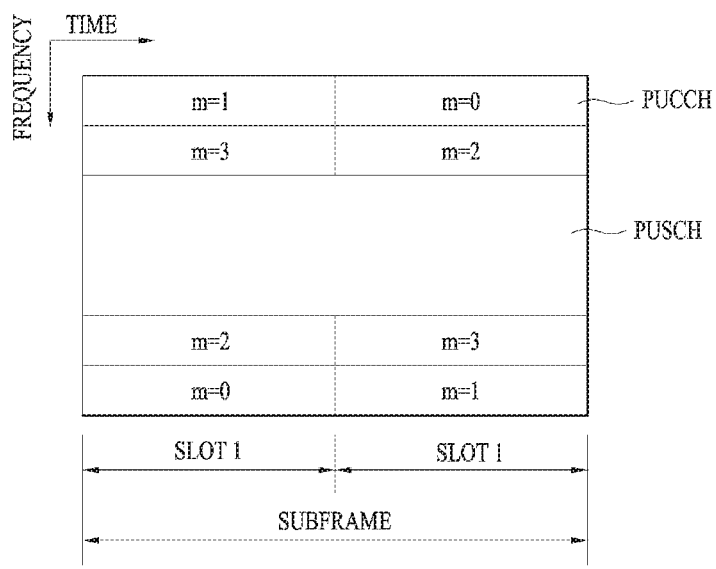
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a description will be given of a MIMO system. MIMO can increase the transmission and reception efficiency of data by using a plurality of Transmission (Tx)

antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
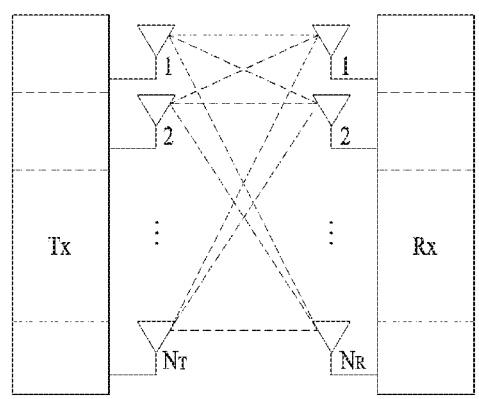
FIG. 7 illustrates a configuration of a general Multiple Input Multiple Output (MIMO) communication system.

FIG. 7 illustrates the configuration of a typical MIMO communication system. Referring to FIG. 7, a transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \qquad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \qquad \text{[Equation 8]}$$

In Equation 8, W2 is a short-term PMI, which is a codeword of a codebook reflecting short-term channel information, W is a codeword of a final codebook, and norm (A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \qquad \text{[Equation 9]}$$

where $X_i$ is Nt/2 by M matrix.

$$W2(j) = \begin{bmatrix} \overbrace{e_M^k \quad e_M^l \quad \cdots \quad e_M^m}^{r\ columns} \\ \alpha_j e_M^k \quad \beta_j e_M^l \quad \gamma_j e_M^m \end{bmatrix} (\text{if } \text{rank} = r),$$

where $1 \leq k,l,m \leq M$ and k,l,m are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown in Equation 10 below.

$$W1(i) * W2(j) = \begin{bmatrix} X_i(k) \\ \alpha_j X_i(k) \end{bmatrix} \qquad \text{[Equation 10]}$$

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
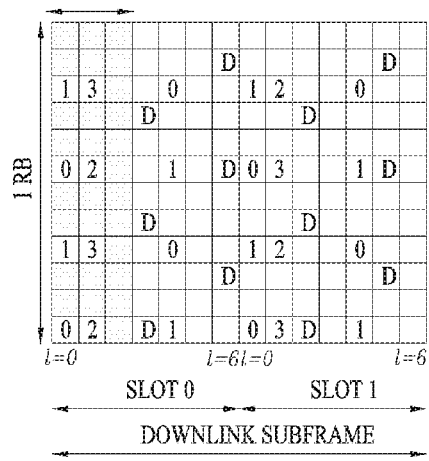
FIGS. 8 and 9 illustrate downlink Reference Signal (RS) configurations in an LTE system supporting downlink transmission through four antennas (4-Tx downlink transmission)
Figure 9:
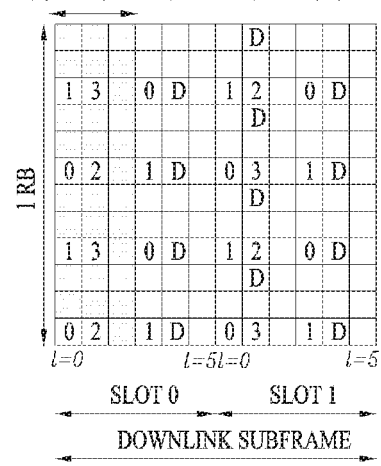

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

Figure 10:
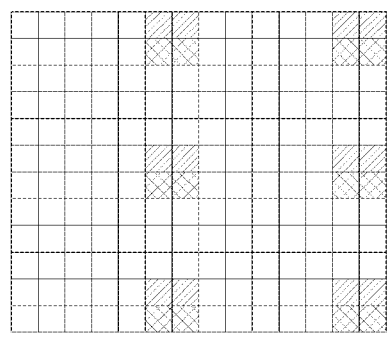
FIG. 10 illustrates an exemplary downlink Demodulation Reference Signal (DMRS) allocation defined in a current 3GPP standard specification.

FIG. 10 illustrates an exemplary DL DMRS allocation defined in a current 3GPP standard specification.

Referring to FIG. 10, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |

TABLE 1-continued

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
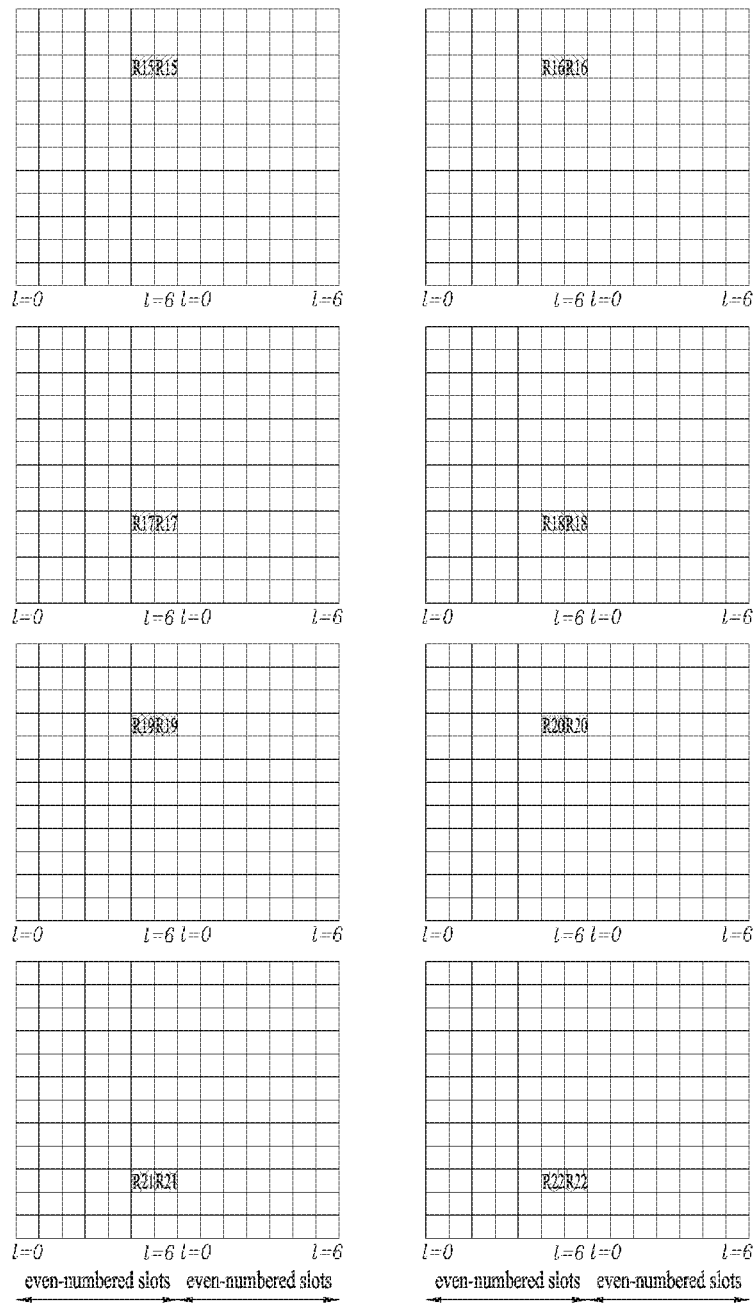
FIG. 11 illustrates Channel State Information-Reference Signal (CSI-RS) configuration #0 of downlink CSI-RS configurations defined in a current 3GPP standard specification.

In [Table 1] and [Table 1], (k',l') represents an RE index where k' is a subcarrier index and l' is an OFDM symbol index. FIG. 11 illustrates CSI-RS configuration #0 of DL CSI-RS configurations defined in the current 3GPP standard. In addition, CSI-RS subframe configurations may be defined, each by a periodicity in subframes, $T_{CSI-RS}$ and a subframe offset $\Delta_{CSI-RS}$. [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |

TABLE 3-continued

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 15-34 | 20 | $I_{CSI-RS} - 15$ |
| 35-74 | 40 | $I_{CSI-RS} - 35$ |
| 75-154 | 80 | $I_{CSI-RS} - 75$ |

Information about a Zero Power (ZP) CSI-RS is transmitted in a CSI-RS-Config-r10 message configured as illustrated in [Table 4] by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 3].

zeroTxPowerResourceConfigList-r10 indicates a ZP CSI-RS configuration. The elements of this bitmap indicate the respective configurations written in the columns for four CSI-RS antenna ports in [Table 1] or [Table 2]. That is, the current 3GPP standard defines a ZP CSI-RS only for four CSI-RS antenna ports.

TABLE 4

```
-- ASN1START
CSI-RS-Config-r10 ::=    SEQUENCE {
    csi-RS-r10           CHOICE {
        ...
    }
    zeroTxPowerCSI-RS-r10    CHOICE {
        release              NULL,
        setup                SEQUENCE {
            zeroTxPowerResourceConfigList-r10    BIT STRING
(SIZE (16)),
            zeroTxPowerSubframeConfig-r10        INTEGER
(0..154)
        }
    }
}
-- ASN1STOP
```

The current 3GPP standard defines modulation orders and cording rates for respective CQI indexes as illustrated in [Table 5].

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A CQI is calculated based on interference measurement as follows.

A UE needs to measure a Signal to Interference and Noise Ratio (SINR) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets $C_{CSI,0}$ and $C_{CSI,1}$ may be configured by higher-layer signaling and the subframes of each subframe set are different from the subframes of the other subframe set. In this case, the UE may perform S-measure in an RS such as a CSI-RS without any specific subframe constraint. However, the UE should calculate CQIs separately for the CSI measurement subframe sets $C_{CSI,0}$ and $C_{CSI,1}$ through separate I-measures in the CSI measurement subframe sets $C_{CSI,0}$ and $C_{CSI,1}$.

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may performing the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An Active Antenna System (AAS) and Three-Dimensional (3D) beamforming will be described below.

In a legacy cellular system, an eNB reduces ICI and increases the throughput of UEs within a cell, for example, SINRs at the UEs by mechanical tilting or electrical tilting, which will be described below in greater detail.

Figure 12:
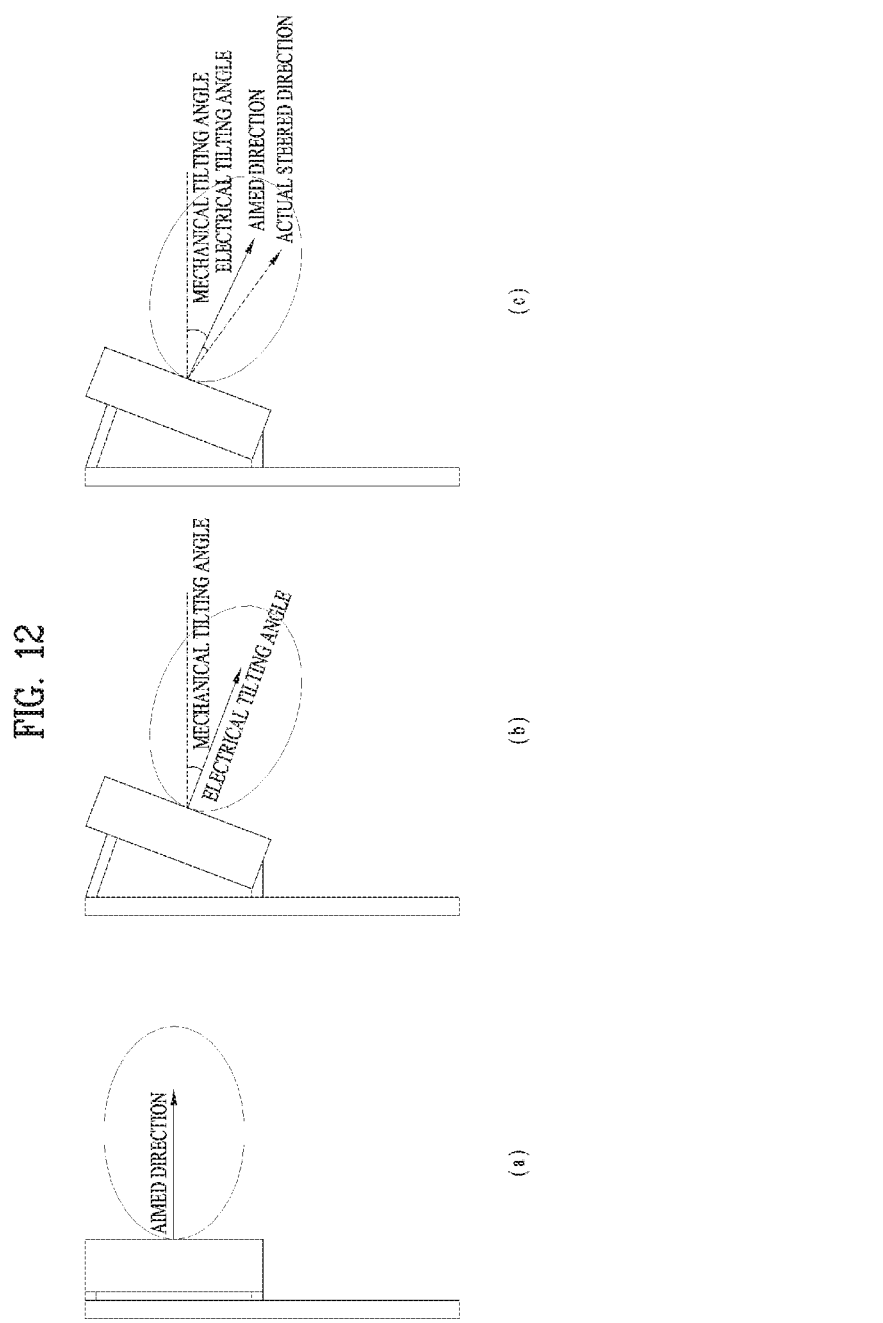
FIG. 12 illustrates antenna tilting schemes.

FIG. 12 illustrates antenna tilting schemes. Specifically, FIG. 12(a) illustrates an antenna configuration to which antenna tilting is not applied, FIG. 12(b) illustrates an antenna configuration to which mechanical tilting is applied, and FIG. 12(c) illustrates an antenna configuration to which both mechanical tilting and electrical titling are applied.

A comparison between FIGS. 12(a) and 12(b) reveals that mechanical tilting suffers from a fixed beam direction at initial antenna installation as illustrated in FIG. 12(b). On the other hand, electrical tilting allows only a very restrictive vertical beamforming due to cell-fixed tilting, despite the advantage of a tilting angle changeable through an internal phase shifter as illustrated in FIG. 12(c).

Figure 13:
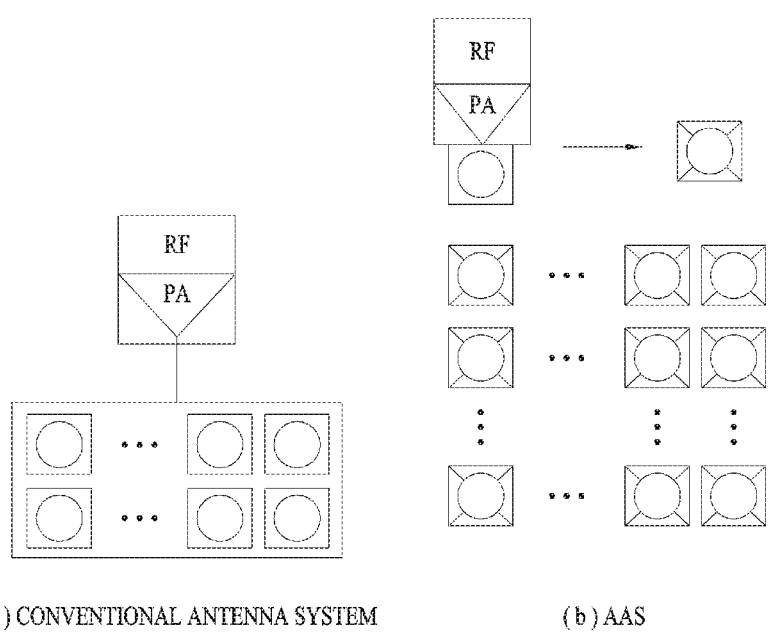
FIG. 13 is a view comparing an antenna system of the related art with an Active Antenna System (AAS)

FIG. 13 is a view comparing an antenna system of the related art with an AAS. Specifically, FIG. 13(a) illustrates the antenna system of the related art and FIG. 13(b) illustrates the AAS.

Referring to FIG. 13, as compared to the antenna system of the related art, each of a plurality of antenna modules includes a Radio Frequency (RF) module such as a Power Amplifier (PA), that is, an active device in the AAS. Thus, the AAS may control the power and phase on an antenna module basis.

In general, a linear array antenna (i.e. a one-dimensional array antenna) such as a ULA is considered as a MIMO antenna structure. A beam that may be formed by the one-dimensional array antenna exists on a Two-Dimensional (2D) plane. The same thing applies to a Passive Antenna System (PAS)-based MIMO structure. Although a PAS-based eNB has vertical antennas and horizontal antennas, the vertical antennas may not form a beam in a vertical direction and may allow only the afore-described mechanical tilting because the vertical antennas are in one RF module.

However, as the antenna structure of an eNB has evolved to an AAS, RF modules are configured independently even for vertical antennas. Consequently, vertical beamforming as well as horizontal beamforming is possible. This is called elevation beamforming.

The elevation beamforming may also be referred to as 3D beamforming in that available beams may be formed in a 3D space along the vertical and horizontal directions. That is, the evolution of a one-dimensional array antenna structure to a 2D array antenna structure enables 3D beamforming. 3D beamforming is not possible only when an antenna array is planar. Rather, 3D beamforming is possible even in a ring-shaped 3D array structure. A feature of 3D beamforming lies in that a MIMO process takes place in a 3D space in view of various antenna layouts other than existing one-dimensional antenna structures.

Figure 14:
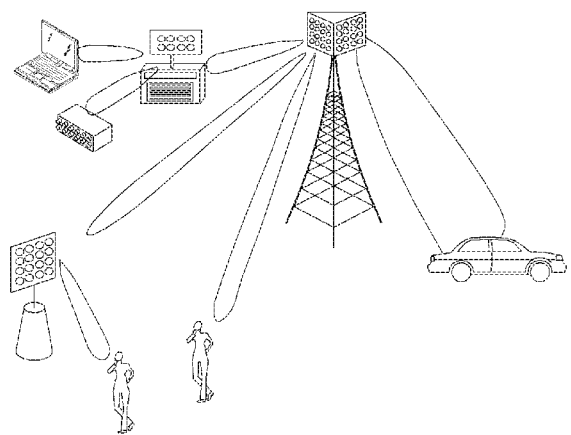
FIG. 14 illustrates an exemplary AAS-based User Equipment (UE)-specific beamforming.

FIG. 14 illustrates an exemplary UE-specific beamforming in an AAS. Referring to FIG. 14, even though a UE moves forward or backward from an eNB as well as to the left and right of the eNB, a beam may be formed toward the UE by 3D beamforming. Therefore, higher freedom is given to UE-specific beamforming.

Further, an outdoor to outdoor environment where an outdoor eNB transmits a signal to an outdoor UE, an Outdoor to Indoor (O2I) environment where an outdoor eNB transmits a signal to an indoor UE, and an indoor to indoor environment (an indoor hotspot) where an indoor eNB transmits a signal to an indoor UE may be considered as transmission environments using an AAS-based 2D array antenna structure.

Figure 15:
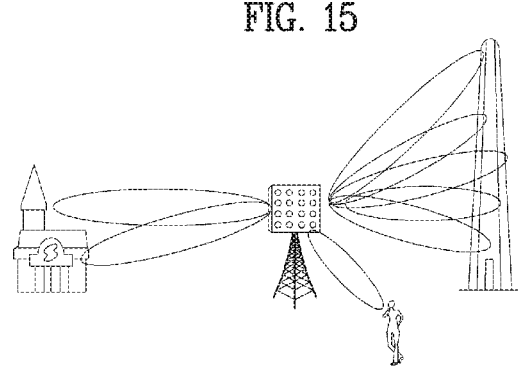
FIG. 15 illustrates an AAS-based two-dimensional beam transmission scenario.

FIG. 15 illustrates an AAS-based 2D beam transmission scenario.

Referring to FIG. 15, an eNB needs to consider vertical beam steering based on various UE heights in relation to building heights as well as UE-specific horizontal beam steering in a real cell environment where there are multiple buildings in a cell. Considering this cell environment, very different channel characteristics from those of an existing wireless channel environment, for example, shadowing/path loss changes according to different heights, varying fading characteristics, etc. need to be reflected.

In other words, 3D beamforming is an evolution of horizontal-only beamforming based on an existing linear one-dimensional array antenna structure. 3D beamforming refers to a MIMO processing scheme performed by extending to or combining with elevation beamforming or vertical beamforming using a multi-dimensional array antenna structure such as a planar array.

Now a description will be given of a MIMO system using linear precoding. A DL MIMO system may be modeled as [Equation 11] in frequency units (e.g. a subcarriers) that are assumed to experience flat fading in the frequency domain in a narrow band system or a wideband system.

$$y = Hx + z \qquad \text{[Equation 11]}$$

If the number of Rx antenna ports at a UE is $N_r$ and the number of Tx antenna ports at an eNB is $N_t$, y is an $N_r \times 1$ signal vector received at the $N_r$ Rx antennas of the UE, H is a MIMO channel matrix of size $N_r \times N_t$, x is $N_t \times 1$ transmission signals, and z is an $N_r \times 1$ received noise and interference vector in [Equation 11].

The above system model is applicable to a multi-user MIMO scenario as well as a single-user MIMO scenario. While $N_r$ is the number of Rx antennas at the single UE in the single-user MIMO scenario, $N_r$ may be interpreted as the total number of Rx antennas at multiple UEs in the multi-user MIMO scenario.

The above system model is applicable to a UL transmission scenario as well as a DL transmission scenario. Then, $N_t$ may represent the number of Tx antennas at the UE and $N_r$ may represent the number of Rx antennas at the eNB.

In the case of a linear MIMO precoder, the MIMO precoder may be generally represented as a matrix U of size $N_t \times N_s$ where $N_s$ is a transmission rank or the number of transmission layers. Accordingly, the transmission signal vector x may be modeled as [Equation 12].

$$x = \sqrt{\frac{P_T}{N_s}} Us \qquad \text{[Equation 12]}$$

where $P_T$ is transmission signal energy and s is an $N_s \times 1$ transmission signal vector representing signals transmitted in $N_s$ transmission layers. That is, $E\{s^H U^H Us\}=N_s$. Let $N_t \times 1$ precoding vectors corresponding to the $N_s$ transmission layers be denoted by $u_1, \ldots, u_{N_s}$. Then $U=[u_1 \ldots u_{N_s}]$. In this case, [Equation 12] may be expressed as [Equation 13].

$$x = \sqrt{\frac{P_T}{N_s}} \sum_{i=1}^{N_s} u_i s_i \qquad \text{[Equation 13]}$$

where $S_i$ is an ith element of the vector s. Generally, it may be assumed that signals transmitted in different layers are uncorrelated ($E\{s_j^* s_i\}=0 \forall i \neq j$) and the average magnitude of each signal is the same. If it is assumed that the average energy of each signal is 1 ($E\{|s_i|^2\}=1 \forall i$), for the convenience of description, the sum of the energy of the layer precoding vectors is $N_s$ given as [Equation 14].

$$\sum_{i=1}^{N_s} E\{u_i^H u_i\} = N_s \qquad \text{[Equation 14]}$$

If a signal is to be transmitted with the same power in each layer, it is noted from [Equation 14] that $E\{u_i^H u_i\}=1$.

As a future multi-antenna system such as massive MIMO or large-scale MIMO evolves, the number of antennas will increase gradually. In fact, use of up to 64 Tx antennas is considered for an eNB in the LTE standard, taking into account a 3D MIMO environment.

However, as the number of antennas increases, pilot overhead and feedback overhead also increase. As a result, decoding complexity may be increased. Since the size of the MIMO channel matrix H increases with the number of antennas at an eNB, the eNB should transmit more measurement pilots to a UE so that the UE may estimate the MIMO channels. If the UE feeds back explicit or implicit information about the measured MIMO channels to the eNB, the amount of feedback information will increase as the channel matrix gets larger. Particularly when a codebook-based PMI feedback is transmitted as in the LTE system, the increase of antennas in number leads to an exponential increase in the size of a PMI codebook. Consequently, the computation complexity of the eNB and the UE is increased.

In this environment, system complexity and overhead may be mitigated by partitioning total Tx antennas and thus transmitting a pilot signal or a feedback on a sub-array basis. Especially from the perspective of the LTE standard, a large-scale MIMO system may be supported by reusing most of the conventional pilot signal, MIMO precoding scheme, and/or feedback scheme that support up to 8 Tx antennas.

From this viewpoint, if each layer precoding vector of the above MIMO system model is partitioned into M sub-precoding vectors and the sub-precoding vectors of a precoding vector for an ith layer are denoted by $u_{i,1}, \ldots, u_{i,M}$, the precoding vector for the ith layer may be represented as $u_i = [u_{i,1}^T u_{i,2}^T \ldots u_{i,M}^T]^T$.

Each sub-precoding vector experiences, as effective channels, a sub-channel matrix including Tx antennas in a partition corresponding to the sub-precoding vector, obtained by dividing the $N_r \times N_t$ MIMO channel matrix H by rows. The MIMO channel matrix H is expressed using the sub-channel matrices, as follows.

$$H=[H_1 \ldots H_M] \qquad \text{[Equation 15]}$$

If the UE determines each preferred sub-precoding vector based on a PMI codebook, an operation for normalizing each sub-precoding vector is needed. Normalization refers to an overall operation for processing the value, size, and/or phase of a precoding vector or a specific element of the precoding vector in such a manner that sub-precoding vectors of the same size may be selected from a PMI codebook for the same number of Tx antennas.

For example, if the first element of the PMI codebook is 0 or 1, the phase and size of each sub-precoding vector may be normalized with respect to 0 or 1. Hereinbelow, it is assumed that a sub-precoding vector $u_{i,m}$ for an mth partition is normalized with respect to a value of $\alpha_{i,m}$ and the normalized sub-precoding vector or the Normalized Partitioned Precoder (NPP) is $v_{i,m}=u_{i,m}/\alpha_{i,m}$. Therefore, partitioned precoding is modeled as [Equation 16], in consideration of codebook-based precoding.

$$u_i = [\alpha_{i,1} v_{i,1}^T \alpha_{i,2} v_{i,2}^T \ldots \alpha_{i,M} v_{i,M}^T]^T \qquad \text{[Equation 16]}$$

As noted from [Equation 16], the values of $\alpha_{i,m}$ may be interpreted as values that link the NPPs to each other from the perspective of the whole precoder. Hereinafter, these values will be referred to as linking coefficients. Thus, a precoding method for the total Tx antennas (antenna ports) may be defined by defining NPPs for the partitions of antenna ports and linking coefficients that link the NPPs to one another.

M linking coefficients for the ith layer may be defined as a vector $a_i=[\alpha_{i,1} \alpha_{i,2} \ldots \alpha_{i,M}]^T$. Herein, $a_i$ will be referred to as a 'linking vector'.

While it may be said that the linking vector is composed of M values, the other (M−1) values $b_i$ normalized with respect to the first element of the linking vector may be regarded as the linking vector. That is, the relative differences of the other (M−1) NPPs with respect to the first NPP may be defined as a linking vector as expressed in [Equation 17]. This is because it is assumed in many cases that the first element is already normalized from the perspective of the whole precoding vector $u_i$.

$$\frac{a_i}{\alpha_{i,1}} = \begin{bmatrix} 1 & \frac{\alpha_{i,2}}{\alpha_{i,1}} & \frac{\alpha_{i,3}}{\alpha_{i,1}} & \ldots & \frac{\alpha_{i,M}}{\alpha_{i,1}} \end{bmatrix}^T = [1 b_i^T]^T \qquad \text{[Equation 17]}$$

If each of the transmission layers is divided into the same number of partitions, a linking matrix expressed as [Equation 18] may also be defined. An NPP for each partition in the form of a matrix may be defined as [Equation 19].

$$A=[a_1 \ldots a_{N_s}] \qquad \text{[Equation 18]}$$

$$V_m=[v_{1,m} \ldots v_{N_s,m}], m=1, \ldots, M \qquad \text{[Equation 19]}$$

Let a vector obtained by repeating each element of an M×1 linking vector as many times as the size of each partition be denoted by an extended linking vector $\hat{a}_i$. For example, if M=2 and the sizes of the first and second partitions are 3 and 4, respectively for an ith layer, $\hat{a}_i = [\alpha_{i,1} \alpha_{i,1} \alpha_{i,1} \alpha_{i,2} \alpha_{i,2} \alpha_{i,2}]^T$. An extended linking matrix $\hat{A} = [\hat{a}_1 \ldots \hat{a}_{N_s}]$ may be defined by stacking the extended linking vectors.

In this case, the whole precoding matrix may be expressed as a Hadamard product (or element-wise product) between the extended linking matrix and the NPP matrix $V_t$ in [Equation 20].

$$U = \hat{A} \circ V_t \qquad \text{[Equation 20]}$$

where $V_t = [V_1^T \ldots V_M^T]^T$ and the matrix operator $\circ$ represents the Hadamard product.

The (extended) linking vectors and the (extended) linking matrix are collectively called a linking precoder. The term precoder is used herein because the (extended) linking vectors and the (extended) linking matrix are elements determining the Tx antenna precoder. As noted from [Equation 20], one linking precoder may be configured, which should not be construed as limiting the present invention. For example, a plurality of sub-linking vectors may be configured by additional partitioning of the linking vector $a_i$ and sub-linking precoders may be defined accordingly. While the following description is given in the context of a single linking precoder, a linking precoder partitioning scenario is not excluded.

While the linking coefficients are represented in such a manner that different linking coefficients are applicable to different transmission layers in the same partition, if each layer is partitioned in the same manner, the linking coefficients may be configured independently of the transmission layers. That is, the same linking coefficients may be configured for every layer. In this case, the relationship that $a \triangleq a_1 = \ldots = a_{N_s}$ is established between the linking vectors. Then the linking precoder may be expressed only with M or (M−1) linking coefficients.

MIMO precoding schemes may be categorized largely into closed-loop precoding and open-loop precoding. When a MIMO precoder is configured, channels between a transmitter and a receiver are considered in the closed-loop precoding scheme. Therefore, additional overhead such as transmission of a feedback signal from a UE or transmission of a pilot signal is required so that the transmitter may estimate MIMO channels. If the channels are accurately estimated, the closed-loop precoding scheme outperforms the open-loop precoding scheme. Thus, the closed-loop precoding scheme is used mainly in a static environment experiencing little channel change between a transmitter and a receiver (e.g. an environment with a low Doppler spread and a low delay spread) because the closed-loop precoding scheme requires channel estimation accuracy. On the other hand, the open-loop precoding scheme outperforms the closed-loop precoding scheme in an environment experiencing a great channel change between a transmitter and a receiver because there is no correlation between the channel change between the transmitter and the receiver and a MIMO precoding scheme.

To apply closed-loop precoding to a massive MIMO environment having a large number of antennas, information about each sub-precoder and information about a linking precoder are required. Without codebook-based feedback, the linking precoder information may not be needed. Depending on a partitioning method, effective channels experienced by each sub-precoder may have different characteristics from effective channels experienced by the linking precoder.

For example, one sub-precoder may experience MIMO channels having a relatively low Doppler spread, whereas another sub-precoder may experience MIMO channels having a relatively high Doppler spread. In another example, while all sub-precoders may experience effective channels having similar Doppler characteristics, the linking precoder may experience effective channels having different Doppler characteristics. Hereinafter, a fractional beamforming scheme for adaptively optimizing a MIMO transmission scheme according to partitioned channels and linking channels in the partitioned precoding environment will be described.

<Fractional Beamforming>

An eNB may perform closed-loop precoding with respect to some of precoders for antenna port partitions and linking precoders for linking antenna port partitions and apply one of the following precoding schemes to the other precoders.

1. A precoding scheme defined in a system (hereinafter, default precoding)
2. A precoding scheme pre-designated by an eNB or a network (hereinafter, reference precoding)
3. A precoding scheme randomly set by an eNB (hereinafter, random precoding)

Hereinafter, a set of partitions and/or linking coefficients, to which closed-loop precoding is applied, is referred to as a control space and a set of partitions and/or linking coefficients, to which closed-loop precoding is not applied, is referred to as a non-control space.

The default precoding scheme which is defined in the system refers to a method of defining and using a beam transmitted to the non-control space in the system. Default precoding may be defined to follow an arbitrary open-loop precoding scheme. Default precoding may be differently configured according to system bandwidth, the number of transmit antennas of an eNB, the number of transmission layers (or transmission rank), transmit antenna configurations $N_{t\_v}$ and $N_{t\_h}$ of an eNB or the number of transmit antennas of a non-control direction. Alternatively, a specific beam may be configured regardless of the system parameters. In addition, default precoding may be fixed over the entire frequency band and time or may be changed in specific time or frequency resource units.

In addition, the reference precoding scheme which is pre-designated by the eNB or the network refers to a method of designating a precoding scheme to be applied to the non-control space with respect to a UE in the eNB or the network. Accordingly, reference precoding information of the non-control space is delivered to the UE via a physical layer or higher layer message. The reference precoding information means all information explicitly or implicitly indicating a MIMO precoder to be applied to the non-control space. For example, a specific index (PMI) of a PMI codebook corresponding to the number of transmit antennas in the non-control space, a quantized value of each element of a MIMO precoding matrix of the non-control space, an index to be used for transmission after indexing a plurality of MIMO precoding schemes may be signaled as reference precoding information.

In addition, reference precoding may change in specific time or frequency resource units. In this case, after a plurality of change patterns is defined according to time/frequency resources of reference precoding, a reference precoding pattern index used in the eNB or the network may be signaled as reference precoding information. Alternatively, the seed value of a random number generator for deriving a change pattern according to time/frequency resources may also be used as reference precoding information. Alternatively, information as to which of various precoding schemes (e.g., STBC, delay diversity, etc.) is used may be used as reference precoding information.

Further, a random precoding scheme which is randomly set by the eNB means a method of arbitrarily determining and applying a precoding scheme to be applied to the non-control space at the eNB. Accordingly, unlike the default precoding scheme or the reference precoding scheme, the UE does not know the precoder to be applied to the non-control space. For example, the eNB may transmit a beam randomly changed in specific time resource units (e.g., OFDM symbols) and/or frequency resource units (e.g., subcarriers) to the non-control space.

In the above-described fractional beamforming schemes, independent partitioning and fractional beamforming schemes are applicable according to transmission layers. Alternatively, the same partitioning and fractional beamforming scheme is applicable to all transmission layers.

The above-described fractional beamforming scheme is suitable for a channel environment in which reliability of feedback information of some transmit antennas or feedback information of linking coefficients decreases or feedback is unnecessary. In particular, when reliability of feedback information of some of transmit antennas or feedback information of linking coefficients decreases, unnecessary packet reception errors and retransmission due to feedback information errors may be prevented and, when feedback is unnecessary, feedback overhead may be minimized.

<Aligned Partitioned Precoding>

If some or all antenna port partitions have the same size and partitioned antenna arrays have similar efficient channel properties, the same precoding scheme, that is, aligned partitioned precoding, is applicable to the NPPs.

Figure 16:
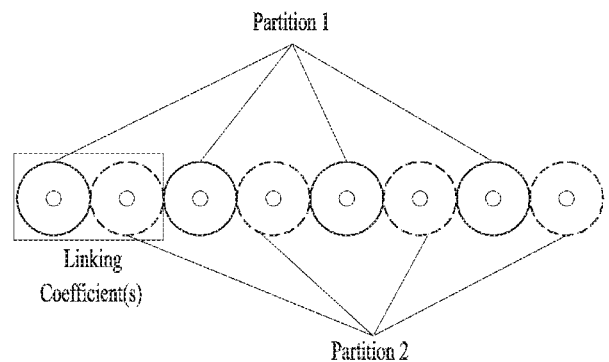
FIG. 16 illustrates an example of applying aligned fractional precoding to a Uniform Linear Array (ULA) according to another embodiment of the present invention.

FIG. 16 illustrates an example of applying aligned partitioned precoding in a uniform linear array.

Referring to FIG. 16, in the uniform linear array (ULA) composed of eight antennas, a first partition is composed of first, third, fifth and seventh antennas and a second partition is composed of second, fourth, sixth and eighth antennas. If a gap between antennas is narrow and few scatterers are present, the first partition and the second partition are likely to experience similar MIMO channels except for a phase difference between the two partitions corresponding to a linking precoder component. In this case, the same precoding scheme is configured to be applied to the two partitions.

Figure 17:
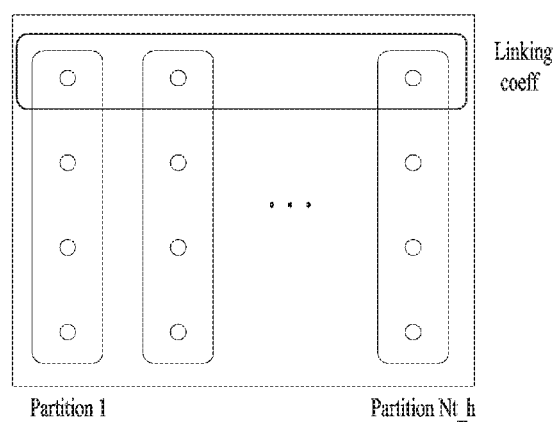
FIG. 17 illustrates an example of applying columnwise aligned fractional precoding to a square array according to another embodiment of the present invention.

FIG. 17 illustrates an example of applying column based aligned partitioned precoding in a square array.

Referring to FIG. 17, in a square array composed of $N_t$ ($=N_{t\_v} \times N_{t\_h}$) antennas including $N_{t\_v}$ rows and $N_{t\_h}$ columns, each column is configured as one partition. In an environment in which a distance between columns is close and $N_{t\_h}$ is not large, the same precoding scheme may be configured to be applied to all partitions. A linking vector is configured independently of a sub-precoder.

Figure 18:
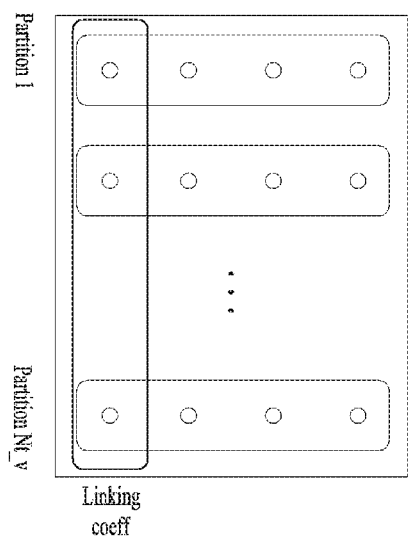
FIG. 18 illustrates an example of applying rowwise aligned fractional precoding to a square array according to another embodiment of the present invention.

FIG. 18 illustrates an example of applying row based aligned partitioned precoding in a square array.

Referring to FIG. 18, in a square array composed of $N_t$ ($=N_{t\_v} \times N_{t\_h}$) antennas including $N_{t\_v}$ rows and $N_{t\_h}$ columns, each column is configured as one partition. In an environment in which a distance between columns is close and $N_{t\_h}$ is not large, the same precoding scheme may be configured to be applied to all partitions. A linking vector is set independently of a sub-precoder.

Figure 19:
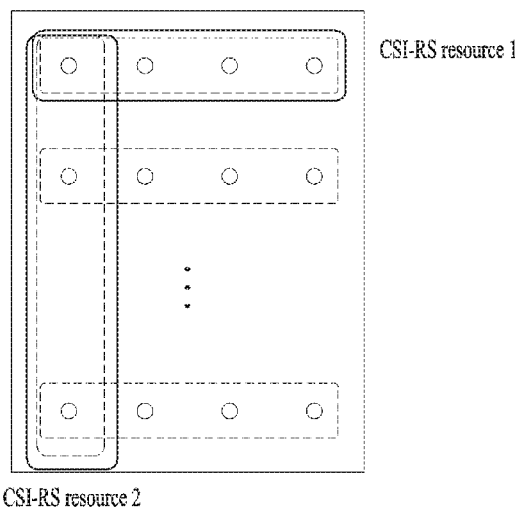
FIG. 19 is a diagram showing a method of feeding back CSI in 3D beamforming.

FIG. 19 is a diagram showing a method of feeding back CSI in 3D beamforming.

If a closed-loop transmission scheme is supported in a wireless communication system, to which 3D beamforming is applied, a UE may transmit CSI to an eNB in an analog or digital form based on a received pilot signal. At this time, in a frequency division duplexing (FDD) system used in LTE, since uplink and downlink frequency bands are different, a method of, at an eNB, estimating a downlink channel may not be suitable. Accordingly, a UE may configure and transmit feedback information to an eNB. Feedback information may be divided into explicit information and implicit information. In consideration of feedback overhead, implicit information of a preferred precoder index (PPI) may be mainly used.

If a closed-loop transmission scheme is applied to a wireless communication system, to which 3D beamforming is applied, a UE may provide feedback information to an eNB in the form of implicit feedback. At this time, as described above, in order to support partitioned precoding, PPI information of each partition precoder and PPI information of a preferred linking precoder need to be configured as feedback information. In the case of perfectly aligned precoding in which all partitioned precoders are equally configured, a transmitter should determine a common partitioned precoder commonly applied to all antenna port partitions and a linking precoder linking the antenna port partitions. Accordingly, a UE should configure feedback information such that an eNB appropriately configures an aligned partitioned precoder and a linking precoder. A method of, at a UE, configuring feedback information has a close relation to a method of, at an eNB, transmitting a pilot signal.

At this time, referring to FIG. 19, one pilot pattern may be transmitted in one partition based on QCL. At this time, another pilot pattern may be transmitted by a first antenna port or an antenna port of arbitrarily fixed order of each partition. A UE may perform channel measurement with respect to a horizontal domain and a vertical domain based on each pilot pattern and performs feedback to an eNB. At this time, the horizontal domain and the vertical domain may be independently implemented and fed back as a partitioned precoder and a linking precoder. In contrast, the vertical domain and the horizontal domain may be independently implemented and fed back as a partitioned precoder and a linking precoder, without being limited to the above-described embodiment.

At this time, the UE may feed back a PPI applied to a first pilot pattern to the eNB based on QCL. In addition, the UE may feed back a PPI applied to a second pilot pattern to the eNB based on QCL. At this time, for example, if a first pilot pattern is a horizontal domain, a second pilot pattern may be a vertical domain. In contrast, if a first pilot pattern is a vertical domain, a second pilot pattern may be a horizontal domain. That is, the PPI applied to each of the first and second pilot patterns may be for any one of the portioning precoder and the linking precoder.

Thereafter, the UE may feed back RI and CQI information to the eNB in consideration of the PPIs applied to the horizontal domain and the vertical direction. To this end, the eNB may receive feedback information of the horizontal domain and the vertical domain in an environment, to which 3D beamforming is applied, to perform channel estimation.

Figure 20:
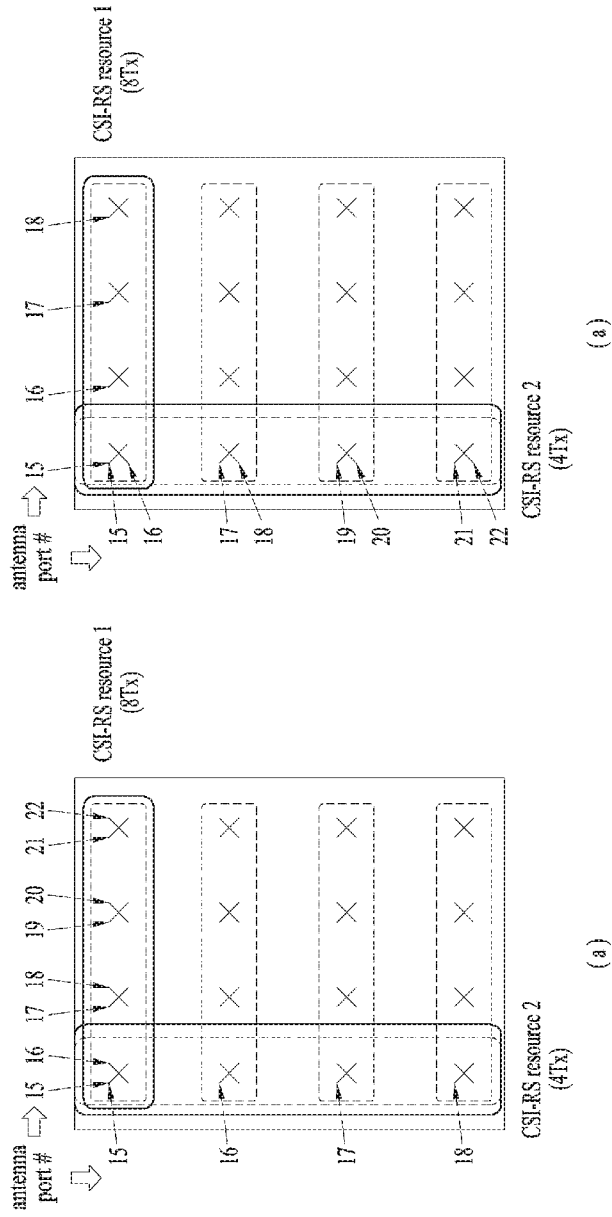
FIG. 20 is a diagram showing a method of feeding back CSI based on a dimension in 3D beamforming.

FIG. 20 is a diagram showing a method of feeding back CSI based on a dimension in 3D beamforming.

As described above, in a wireless communication system, to which 3D beamforming is applied, a UE may feed back CSI based on a closed-loop transmission scheme. At this time, a feedback information configuration method is applicable regardless of polarization of an eNB antenna. More specifically, the UE feeds back CSI of the horizontal domain and the vertical domain to the eNB even when a polarization dimension is changed.

For example, referring to FIG. 20, the number of antenna port rows (hereinafter, M) may be 4, the number of antenna port columns (hereinafter, N) may be 4 and a polarization dimension (hereinafter, P) may be 2. At this time, as shown in (a) of FIG. 20, one partition composed of only specific polarization antenna ports may be configured in a row. That is, in a planar antenna array of (M, N, P), a feedback precoder may be configured on the assumption that the number of antenna ports for the horizontal domain is M*P and the number of antenna ports for the vertical domain is N. At this time, the number of transmit antennas configuring a PMI as feedback information of the horizontal domain may be M*P and the number of transmit antennas configuring a PMI as feedback information of the vertical domain may be N.

In addition, as shown in (b) of FIG. 20, a feedback precoder may be configured on the assumption that that the number of antenna ports for the horizontal domain is M and the number of antenna ports for the vertical domain is N*P. The number of transmit antennas configuring a PMI as feedback information of the horizontal domain may be M and the number of transmit antennas configuring a PMI as feedback information of the vertical domain may be N*P. Upon designing a polarization antenna based precoder, a polarization property and a linear array property may be divided. Such design is derived from the fact that ULA channels for different polarizations are similar except for phase, and can improve performance as compared to feedback overhead. For example, a dual codebook of the above-described 8Tx PMI is derived from a product of two precoding matrices W1 and W2, W1 may be a uniform linear array (ULA) and W2 may have a cross polarization property.

Figure 21:
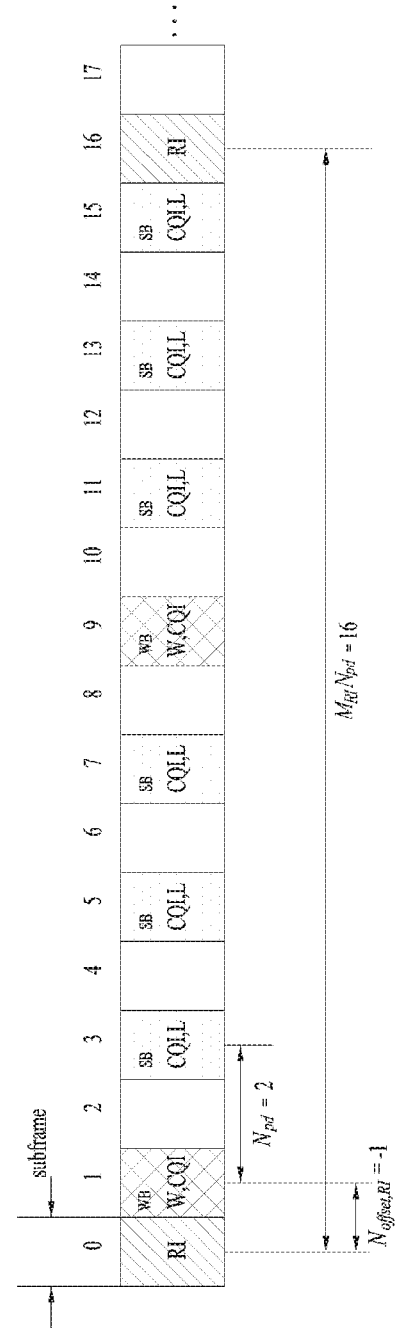
FIG. 21 is a diagram showing a method of feeding back CSI according to an embodiment of the present invention.

FIG. 21 is a diagram showing a method of feeding back CSI according to an embodiment of the present invention.

For example, CSI may be periodically fed back through a PUCCH or may be aperidocally transmitted through a PUSCH. At this time, if the CSI is periodically fed back through the PUCCH, a CSI period and an offset value may be set. More specifically, as described above, CSI may be broadly divided into RI (Rank Indicator), PMI (Precoding Matrix Index) and CQI (Channel Quality Indication). At this time, the RI indicates rank information of a channel as described above and means the number of streams capable of being received by the UE through the same time-frequency resources. In addition, the RI is determined by long term fading of the channel and thus may be fed back to the eNB at a longer period than the PMI and the CQI. In addition, the PMI may include the spatial properties of the channel and indicate a precoding matrix index of an eNB preferred by the UE based on a metric such as SINR. In addition, the CQI indicates the intensity of the channel and may generally mean a reception SINR capable of being obtained when the eNB uses the PMI. That is, the RI, the PMI and the CQI may have different feedback periods and offset values.

At this time, if CSI is fed back through the PUCCH, the amount of fed-back information may be restricted by restricted resources. Accordingly, if CSI is transmitted through the PUCCH, information included in the transmitted CSI may be controlled based on a reporting mode and/or type. That is, the transmission times and offset values of the RI, the PMI and the CQI may be determined based on the reporting mode and/or type of the transmitted CSI. At this time, for example, the transmission period and the offset value of the CSI may be set with respect to the UE through a higher layer message. In addition, at this time, for example, the higher layer message may be an RRC signal.

In addition, for example, referring to FIG. 21, in the above-described CSI reporting mode, which CSI is fed back may be set. At this time, in a specific CSI reporting mode, information to be included in CSI transmitted at a specific time or subframe may be determined by a reporting type and data payload size. Accordingly, the transmission time and offset of the CQI and the PMI and the transmission time and offset of the RI may be changed according to CSI reporting mode.

In addition, for example, in the case of a type in which a WB CQI and an SB CQI are both transmitted, the WB CQI and the SB CQI are alternately transmitted. In this case, the WB CQI is transmitted in a first CQI transport subframe and a CQI of a subband having a good channel state among subbands belonging to a first bandwidth part (BP) and the index of the subband are transmitted in a next CQI transport subframe. In a subsequent CQI transport subframe, a CQI of a subband having a good channel state among subbands belonging to a second bandwidth part (BP) and the index of the subband are transmitted.

At this time, information on how many times each BP CQI is sequentially transmitted is signaled by a higher layer (e.g., RRC layer). In addition, the RI feedback period and offset value and the CQI/PMI feedback period and offset value may be set with respect to the UE through a higher layer message, as described above.

At this time, for example, in FIG. 21, CSI feedback may include CSI transmission of three reporting types. Specifically, an RI may be transmitted in a first subframe, a WB PMI and a WB CQI may be transmitted in a second subframe, and an SB CQI and an L-bit best-1 CQI SB indicator may be transmitted in a fourth subframe.

Figure 22:
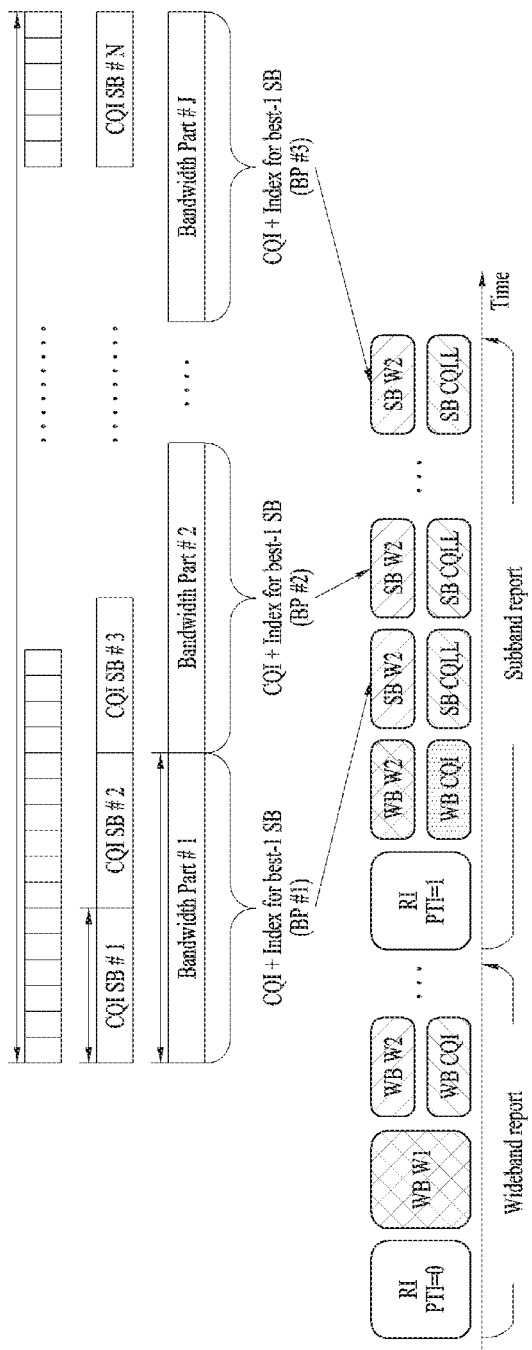
FIG. 22 is a diagram showing a wideband (WB) CSI feedback and subband (SB) CSI feedback method.

FIG. 22 is a diagram showing a wideband (WB) CSI feedback and subband (SB) CSI feedback method.

As described above, the PMI has a dual structure. At this time, for example, in an LTE-A system, if the number of transmit antenna ports is 8 or if the number of transmit antenna ports is 4 and alternativeCodeBookEnabled For4TX-r12=TRUE is set through RRC signaling, a PMI having a dual structure may be configured. At this time, if the PMI is periodically fed back by the PUCCH, a 1-bit indicator, that is, PTI (Precoder Type Indication), may be set and periodic feedback may be performed in two modes according to the value of the indicator as shown in FIG. 22. At this time, for example, in these modes, an RI and a 1-bit PTI value may be included in a first subframe. In the case of PTI=0 mode, WB CSI feedback may be transmitted and, in the case of PTI=1 mode, SB CSI feedback may be transmitted. At this time, W1 and W2 may indicate the above-described PMI having the dual structure. If the PMI has a dual structure, W1 and W2 of the WB/SB should be decided in order to determine a precoding matrix W by combining W1 and W2. That is, in the WB or SB, the eNB can find a final W of the WB or SB when W1 and W2 are both fed back. Therefore, based on the final W, the CQI of the WB or SB may be determined. At this time, as described above, since the RI value is mainly determined by long term fading, the RI may be fed back at a longer period than the PMI and the CQI (infrequently). Meanwhile, if previously transmitted RI and/or PTI values are wrong, mismatch between the eNB and the UE occurs in the size of the payload of subsequently transmitted CSI, thereby causing decoding errors of the CSI or decreasing reliability. Accordingly, the RI and/or PTI are allocated to a first subframe of CSI feedback to increase an effective code rate of the information, thereby preventing performance deterioration. In addition, if the RI exceeds 2, the CQI value of each subband may be represented in the form of a differential (SB CQI=SB CQI index− WB CQI index). In addition, if the number of bits of CSI feedback exceeds the size of the payload of PUCCH feedback (e.g., 11 bits), maximum feedback bit allocation may be restricted to the size of the payload using a codebook subsampling scheme.

Hereinafter, embodiments of the present invention in a wireless communication system, to which 3D beamforming is applied, will be described.

Figure 23:
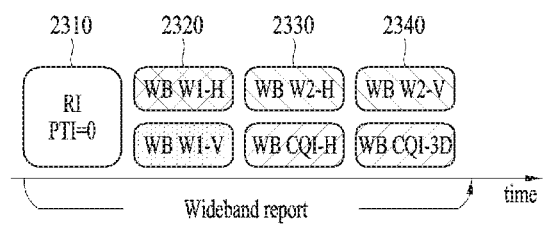
FIG. 23 is a diagram showing a WB CSI feedback method in 3D beamforming.

FIG. 23 is a diagram showing a WB CSI feedback method in 3D beamforming.

As described above, in a wireless communication system, to which 3D beamforming is applied, if a UE feeds back CSI, the UE may feed back CSI for a horizontal domain and CSI for a vertical domain. At this time, the UE may feed back a PMI (H-PMI) for the horizontal domain and a PMI (V-PMI) for the vertical domain to the eNB as CSI information based on each domain. As described above, if CSI is periodically fed back through the PUCCH, the resources of the PUCCH may be restrictive. Accordingly, in a wireless communication system, to which 3D beamforming is applied, a method for, at the UE, periodically feeding back the CSI for the horizontal domain and the CSI for the vertical domain through the PUCCH may be necessary. Although the CSI periodically fed back through the PUCCH is described in the above-described and below-described configurations, the present invention is applicable to the CSI aperiodically fed back through the PUSCH and is not limited to the above-described embodiment.

The UE may receive a pilot signal from the eNB. The UE feeds back CSI based on the received pilot signal. At this time, the UE may feed back the CSI for the horizontal domain and the CSI for the vertical domain to the eNB. At this time, the CSI for the horizontal domain is first CSI and the CSI for the vertical domain may be second CSI. That is, the UE may feed back the CSI for each of the horizontal domain and the vertical domain. At this time, for example, the UE may divide the feedback mode of the CSI based on a precoding indicator. At this time, the precoding indicator may be a precoding type indicator (PTI). In addition, for example, the precoding indicator may be information indicated through another field. That is, the precoding indicator may be an indicator or field indicating a method of feeding back CSI for the horizontal domain and the vertical domain in a 3D beamforming environment and is not limited to a PTI.

In addition, for example, the precoding indicator may have 1 bit. That is, the precoding indicator may have a value of 0 or 1. As another example, the precoding indicator may have 2 bits. That is, the precoding indicator may have values of 0, 1, 2 or 3, which will be described below. In addition, the precoding indicator may include information based on more bits as multiple bits, without being limited to the above-described embodiment.

For example, if the precoding indicator indicates a first value, the UE may feed back WB first CSI and WB second CSI. That is, if the precoding indicator indicates a first value, the UE may feed back WB CSI for each of the horizontal and vertical domains. As another example, if the precoding indicator indicates a second value, the UE may feed back SB first CSI and SB second CSI. That is, if the precoding indicator indicates a second value, the UE may feed back SB CSI for each of the horizontal and vertical domains. At this time, for example, the precoding indicator may have 1 bit. At this time, if the first value is 0, the second value may be 1. In contrast, if the first value is 1, the second value may be 0. At this time, WB CSI may be CSI for a wide frequency band. In addition, SB CSI may be CSI for a narrow frequency band. For example, the UE may feed back only CSI for a preferred subband to the eNB.

In addition, for example, the UE may be configured to perform WB CSI feedback earlier than SB CSI feedback. More specifically, the PMI may be fed back in a dual structure based on a codebook. That is, the UE may feed back W1 and W2 to the eNB as a PMI having a dual structure. The eNB may find W as a final PMI using the fed-back W1 and W2. At this time, the eNB may require a predetermined time until W1 and W2 for WB and SB are fed back, in order to find the final W of SB. At this time, the eNB cannot find accurate SB PMI information during a feedback time delay period. Accordingly, the UE preferentially feeds back WB PMI information and then feeds back SB PMI information, thereby decreasing channel estimation errors. For example, in order for the UE to feed back the PMI information for the preferred SB, the WB PMI information may be preferentially fed back and then the PMI information for a preferred band may be fed back. At this time, the eNB may immediately find the final W through W1 of the WB PMI and the W2 of the SB PMI when the SB PMI information is received.

In addition, in an environment, to which 3D beamforming is applied, the feedback method of CSI may be variously configured. At this time, for example, the PMI may be fed back in a dual structure based on a codebook as described above.

At this time, for example, referring to FIG. 23, if the precoding indicator is a first value, the UE may feed back WB CSI to the eNB. At this time, the CSI may include WB first CSI for the horizontal domain and WB second CSI for the vertical domain. At this time, the WB first CSI has a dual structure and may include a WB first H-PMI (WB W1-H) and a WB second H-PMI (WB W2-H). In addition, the WB second 2 CSI has a dual structure and may include a WB first V-PMI (WB W1-V) and a WB second V-PMI (WB W2-V).

At this time, for example, the CSI may be fed back based on a period of four subframes. The feedback period of the CSI may be changed and the above-described configuration may be an embodiment. In addition, subframes included in the period of the CSI may be consecutive or inconsecutive, without being limited to the above-described embodiment.

At this time, the UE may feed back information on the RI and the precoding indicator in a first subframe 2310. At this time, if the precoding indicator is a first value, the UE may feed back WB W1-H and WB W1-V in a second subframe 2320. That is, the UE feeds back W1 in one subframe as a PMI for the horizontal and vertical domain. Thereafter, the UE may feed back WB W2-H and WB W2-V in a third subframe 2330 and a fourth subframe 2340, respectively. At this time, for example, if WB W2-H is included in the third subframe 2330, WB W2-V may be included in the fourth subframe 2340. At this time, for example, WB CQI-H may be included in the third subframe 2330, along with WB W2-H. That is, when PMI information for the horizontal direction is fed back, CQI information for the horizontal direction may also be fed back. In addition, WB CQI-3D may be included in the fourth subframe 2340, along with WB W2-V. At this time, WB CQI-3D may be a final CQI considering the PMIs for the horizontal domain and the vertical domain.

At this time, for example, a method of calculating a CQI may be determined based on Table 6 below. More specifically, the UE may feed back WB W1-H in the second subframe 2310 and feed back WB W2-H in the third subframe 2330. At this time, the eNB may find W1-H and W2-H to determine WB W-H which is a final PMI for the horizontal domain. To this end, WB CQI-H which is a CQI for the horizontal domain can be calculated. At this time, the UE may feed back WB W1-V in the second subframe 2320 but may not feed back WB W2-V in the third subframe 2330. At this time, if the UE feeds back WB CQI-H in the third subframe 2330, the UE may perform feedback based on Table 6. Thereafter, since WB W2-V is fed back in a fourth subframe 2340, the eNB may find WB W-V. Accordingly, since the UE knows both the PMIs for the horizontal domain and the vertical domain, $CQI_5$ may be fed back as WB CQI-3D based on Table 6. At this time, Table 6 below shows the CQI value according to the amount of PMI information for convenience of representation and the CQI value may not specified according to only the amount of PMI information. Accordingly, although there is a specific PMI transmitted at a previous time, upon determining that the PMI is outdated information (the channel has been changed during CSI feedback) or that information accuracy is low, the UE may ignore the PMI (or regard the PMI as unknown information) and calculate a CQI of a current time based on Table 6.

TABLE 6

| CQI | w/no V-PMI | w/WB V-PMI (W/WB W1-V & WB W2-V) | w/SB V-PMI (+SB W2-V) |
|---|---|---|---|
| w/no H-PMI | $(CQI_1)$ | $CQI_4$ | $CQI_7$ |
| w/WB H-PMI (=w/WB W1-H & WB W2-H) | $CQI_2$ | $CQI_5$ | $CQI_8$ |
| W/SB H-PMI (+SB W2-H) | $CQI_3$ | $CQI_6$ | $CQI_9$ |

As another example, the UE may represent WB CQI-#D transmitted in the fourth subframe 2340 in the form of a differential with the CQI value transmitted in the third subframe 2330, as shown in Equation 21 below. At this time, the UE may feed back only the differential to the eNB, thereby reducing feedback overhead.

WB CQI-3D=WB CQI-H index-WB CQI-3D index   [Equation 21]

As another example, the UE may feed back WB W2-V in the third subframe 2330 and feed back WB W2-H in the fourth subframe 2340. In addition, the UE may also feed back WB CQI-V in the third frame 2330. At this time, referring to Table 6 above, WB CQI-V may be $CQI_4$. In addition, WB CQI-3D fed back in the fourth subframe 2340 may be $CQI_5$, as described above. That is, the UE may change the feedback order of WB W2-V and WB W2-H in the third subframe 2330 and the fourth subframe 2340.

Figure 24:
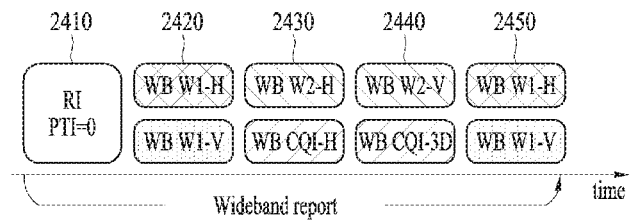
FIG. 24 is a diagram showing a WB CSI feedback method in 3D beamforming.

FIG. 24 is a diagram showing a WB CSI feedback method in 3D beamforming.

As another example, the subframes 2410, 2420, 2430, 244 and 2450 including WB CSI may be consecutive or inconsecutive in terms of time. That is, the UE may set the fed-back information in subframe units and the subframes may be adjacently arranged. In addition, the UE may set the fed-back information in subframe units and the subframes may not be adjacently arranged, without being limited to the above-described embodiment.

As another example, the UE may set the fed-back information in subframe units and the feedback periods of the subframes may be differently set. That is, the feedback periods of the first subframe 2410 including an RI and a precoding indicator, a second subframe 2420 including WB W1-H WB W1-V, a third subframe 2430 including WB W2-V and a fourth subframe 2440 including WB-W2 may be differently set. At this time, for example, the RI feedback period and offset value and the CQI/PMI feedback period and offset value may be delivered to the UE through a higher layer message. At this time, for example, the higher layer message may be an RRC signal. In addition, the UE may receive the information on the period and offset through DCI, without being limited to the above-described embodiment.

At this time, for example, the UE may differently set the feedback period and offset value of each WB CSI during one period. For example, referring to FIG. 24, the first subframe 2410 including the RI and precoding indicator may be transmitted once during the entire WB CSI feedback period. In addition, the UE may transmit, in the fifth subframe 2450, WB W1-H and WB W1-V transmitted in the second subframe 2420 again. That is, the UE may differently set the feedback period and offset value of WB CSI, without being limited to the above-described embodiment.

In addition, the subframes included in the above-described period may be consecutive or inconsecutive, as described above.

Figure 25:
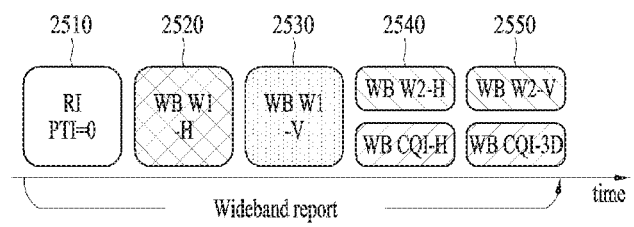
FIG. 25 is a diagram showing a WB CSI feedback method in 3D beamforming.

FIG. 25 is a diagram showing a WB CSI feedback method in 3D beamforming. As described above, the UE may differently feed back WB CSI to the eNB in each subframe. At this time, for example, referring to FIG. 25, if the UE feeds back WB CSI, the UE may feed back WB CSI to the eNB through five subframes 2510, 2520, 2530, 2540 and 2550. At this time, the UE may sequentially feed back WB W1 (that is, WB W1-V and WB W1-H) for the horizontal and vertical domains in the second and third subframes 2520 and 2530. Thereafter, the UE may sequentially feed back WB W2 (that is, WB W2-V and WB W2-H) for the vertical domain and the horizontal domain and the CQI in the fourth and fifth subframes 2540 and 2550. At this time, the CQI calculation method may be determined based on Table 6 above and is equal to the above-described method. At this time, the PMI feedback order of WB W1-V, WB W1-H, WB W2-V and WB W2-H in the second to fifth subframes 2520, 2530, 2540 and 2550 may be changed. In addition, since the amount of information on the PMI known to the eNB in each subframe is changed according to the feedback order, the CQI value fed back along with the PMI may also be changed in the second to fifth subframes 2520, 2530, 2540 and 2550. In addition, the CQI value transmitted in the fifth subframe 2550 may be transmitted in the form of a differential with the CQI value of the fourth subframe 2540. Therefore, feedback overhead can be decreased. In addition, the five subframes 2520, 2530, 2540 and 2550 used for WB feedback may be inconsecutive in terms of time.

In addition, as described above, the feedback periods of the WB CSI feedback (RI/PTI, WB W1-H, WB W1-V, WB W2-V and WB W2-H) may be differently set. The RI feedback period and offset value and the CQI/PMI feedback period and offset value may be set with respect to the UE through a higher layer message. In addition, if the period of WB CSI feedback information is changed, the entire WB CSI feedback period may be greater than five subframes, without being limited to the above-described embodiment.

At this time, although the number of subframes of FIG. 25 is greater than that of FIG. 24 by one, WB W1-V and WB W1-H are divisionally transmitted in the second and third subframes 2520 and 2530, thereby increasing effective code rate of the bit and reducing the transmission error rate of the WB W1 feedback information.

Figure 26:
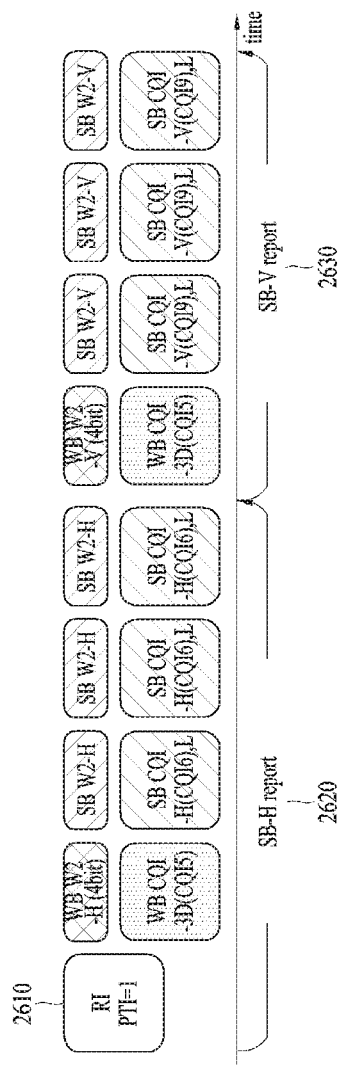
FIG. 26 is a diagram showing an SB CSI feedback method in 3D beamforming.

FIG. 26 is a diagram showing an SB CSI feedback method in 3D beamforming.

If the precoding indicator having 1 bit is a second value, the UE may feed back SB CSI. At this time, for example, the UE may feed back SB first CSI for the horizontal domain in a first part 2620. In addition, the UE may feed SB second CSI for the vertical domain in a second part 2630. At this time, the first part 2620 and the second part 2630 may be divided in terms of time. In addition, the first part 2602 may be earlier than the second part 2630. In addition, for example, the second part 2630 may be earlier than the first part 2620.

More specifically, the UE may include the RI and precoding indicator in the first subframe 2610 in which CSI is transmitted. At this time, the CSI may be transmitted based on a predetermined period and the subframes included in the CSI transmission period may be consecutive or inconsecutive, as described above.

At this time, if the precoding indicator value of the first subframe 1610 is a second value, the UE may perform SB CSI feedback. At this time, for example, the UE may feed back SB CSI for the horizontal domain and then feed back SB CSI for the vertical domain. In addition, in contrast, the UE may feed back SB CSI for the vertical domain and then feed back SB CSI for the horizontal domain, without being limited to the above-described embodiment.

For example, referring to FIG. 26, the UE may first transmit an RI and a precoding indicator of a second value in a first subframe 2610. At this time, for example, the precoding indicator may be PTI, as described above. Thereafter, the UE may feed back WB W2-H for the horizontal domain in a second subframe. At this time, for example, a CQI corresponding to the second subframe may also be fed back. At this time, WB CSI feedback may be earlier than SB CSI feedback, and the eNB may acquire information on WB W1. Accordingly, the UE may feed back WB W2-H and $CQI_5$ of Table 6 in the second subframe. Thereafter, the UE may transmit SB CSI (SB W2-H and SB CQI-H) for the horizontal domain selected in each band part in each subframe. At this time, SB CQI-H may include $CQI_6$ based on Table 6. That is, the eNB may find WB V-PMI based on WB CSI feedback performed earlier than SB CSI feedback. Since SB W2-H has been fed back, in Table 6, $CQI_6$ may be fed back. At this time, in contrast, if SB W2-V for the vertical domain is first fed back, $CQI_8$ may be included, without being limited to the above-described embodiment.

The UE may perform SB CSI feedback for the horizontal domain and then perform SB CSI feedback for the vertical domain. At this time, the SB CQI value may be $CQI_9$ based on Table 6. That is, since the eNB may find SB W2-H and SB W2-V, the $CQI_9$ value may be included.

In addition, referring to FIG. 26, SB W2-H may be included in subframes (third to fifth) per bandwidth part in the first part 2620 for the horizontal direction. In addition, SB W2-H may be included in subframes (seventh to ninth) per bandwidth part in the second part 2630 for the vertical direction. At this time, for example, the CQI values transmitted in third to fifth and seventh to ninth subframes may be transmitted in the form of a CQI value differential with the previously transmitted CQI values. In addition, a differential between SB CQI-x (x being H or V) of each bandwidth part and previously transmitted WB CQI-x (or in a previous subframe), a differential between a preceding SB CQI-x feedback value and subsequent SB CQI-x value(s), and/or a differential between a preceding SB CQI-x feedback value and subsequent SB CQI-y (y being a directional value different from x between H and V) may be represented. Therefore, feedback overhead can be decreased, as compared to transmission of the CQI value. In addition, for example, the CSI feedback order for the horizontal and vertical domains may be changed. In addition, the subframes used for SB CSI feedback may be consecutive or inconsecutive in terms of time.

Figure 27:
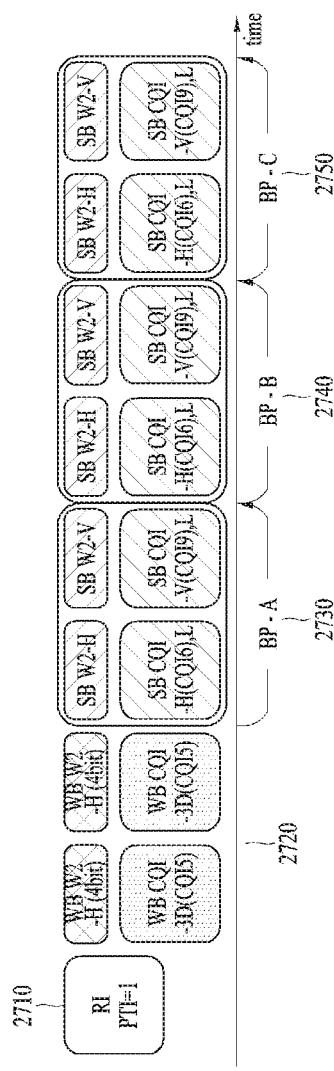
FIG. 27 is a diagram showing an SB CSI feedback method in 3D beamforming.

FIG. 27 is a diagram showing an SB CSI feedback method in 3D beamforming. If the precoding indicator is a second value, the UE may sequentially feed back CSI per bandwidth part. At this time, for example, the bandwidth part may include SB first CSI and SB second CSI. In addition, for example, the bandwidth part may be composed of two subframes including SB first CSI and SB second CSI.

More specifically, the UE may combine SB CSI feedbacks of the horizontal domain and the vertical domain of SB selected in one bandwidth part into one single and feed back the group in two consecutive subframes. At this time, SB CSI feedback for bandwidth parts may be sequentially transmitted. At this time, for example, the transmission order of the bandwidth parts may be changed. That is, feedback of the first bandwidth part may not be performed first.

In addition, for example, the feedback order of the SB CSI for the horizontal and vertical domains fed back in one bandwidth part may be changed. That is, if SB CSI feedback for BP-A is performed, SB W2-V may be first transmitted and then SB W2-H may be transmitted. In addition, the CQI for each bandwidth part may be determined based on Table 6 above, as described above.

In addition, a differential between a CQI value transmitted in each subframe and a previously transmitted CQI value may be transmitted. At this time, a differential between SB CQI-x (x being H or V) of each bandwidth part and previously transmitted WB CQI-x, a differential between preceding SB CQI-x and subsequent SB CQI-x value(s), and/or a differential between preceding SB CQI-x and subsequent SB CQI-y (y being a directional value different from x between H and V) may be represented. Therefore, feedback overhead can be decreased, as compared to transmission of the CQI value.

In addition, for example, even in the SB CSI feedback scheme, the feedback period of the SB CSI feedback information may be differently set, the RI feedback period and offset value and the CQI/PMI feedback period and offset value may be set with respect to the UE through a higher layer message. At this time, for example, the upper layer message may be an RRC signal. The eNB may provide the information through DCI, without being limited to the above-described embodiment.

In addition, although the number of bandwidth parts is three in FIG. 27, the number of bandwidth parts is not limited thereto and may be changed.

Figure 28:
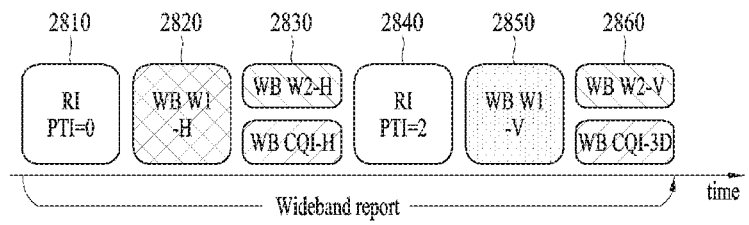
FIG. 28 is a diagram showing a method feeding back WB CSI in 3D beamforming based on a 2-bit indicator.

FIG. 28 is a diagram showing a method feeding back WB CSI in 3D beamforming based on a 2-bit indicator.

If the UE feeds back CSI, the UE may feed back an RI and a precoding indicator in a first subframe in a CSI feedback period. At this time, for example, as described above, the precoding indicator may be PTI. In addition, indices for identifying CSI feedback information WB-H, WB-V, SB-H and SB-V based on current LTE is not limited to the PTI. That is, indices for identifying CSI feedback information WB-H, WB-V, SB-H and SB-V may be defined and (or)

modified in an arbitrary form other than PTI. In addition, the precoding indicator may be composed of multiple bits such as 2 bits or more.

More specifically, if the precoding indicator has 1 bit, the UE may determine whether WB CSI feedback and SB CSI feedback are performed based on a first value and a second value. However, in a wireless communication system, to which 3D beamforming is applied, the UE needs to feed back CSI for horizontal and vertical domains, as described above. At this time, the UE may use a 2-bit or multi-bit precoding indicator in order to consider WB/SB and horizontal/vertical domain.

For example, referring to Table 7 below, the precoding indicator may have 2 bits. At this time, for example, if the precoding indicator is a first value (0), the UE may feed back WB CSI (WB-H) for the horizontal domain. In addition, if the precoding indicator is a second value (1), the UE may feed back SB CSI (SB-H) for the horizontal domain. In addition, if the precoding indicator is a third value (2), the UE may feed back WB CSI (WB-V) for the vertical domain. In addition, if the precoding indicator is a fourth value (3), the UE may feed back SB CSI (SB-V) for the vertical domain. That is, the UE may select whether WB/SB CSI feedback is performed and whether feedback for the horizontal domain and the vertical domain are performed, using a 2-bit precoding indicator.

In addition, for example, if the precoding indicator has 2 bits, the precoding indicator may include a 1-H value indicating that CSI (WB-H) for the horizontal domain is fed back and a 1-V value indicating that WB CSI (WB-V) for the vertical domain is fed back. In addition, the precoding indicator may include a 2-H value indicating that SB CSI (SB-H) for the horizontal domain is fed back and a 2-V value indicating that SB CSI (SB-V) for the vertical domain is fed back.

In addition, for example, if the precoding indicator has 2 bits, the meanings of the bits may be differently set. For example, a first bit of the two bits may indicate whether WB CSI feedback or SB CSI feedback is performed. In addition, a second bit of the two bits may indicate the horizontal domain or the vertical domain. That is, the bits may be independently configured. In addition, the precoding indicator may further include other information including multiple bits, without being limited to the above-described embodiment.

TABLE 7

|  | Wideband | Subband |
|---|---|---|
| Horizontal | precoding indicator = 0 | precoding indicator = 1 |
| Vertical | precoding indicator = 2 | precoding indicator = 3 |

For example, referring to FIG. 28, in feedback of WB-H, WB-V, SB-H and SB-V, an RI and different precoding indicators (or indices for identifying arbitrary CSI feedback information) may be transmitted in first subframes 2810 and 2840 of the information, thereby identifying the type of the feedback information. At this time, unlike FIG. 23, if the UE feeds back WB CSI, the UE may include a subframe in information in a process of feeding back WB-H and WB-V. At this time, for example, the feedback period of the CSI may be set in units of a subframe in which the RI and the precoding indicator are included.

Figure 29:
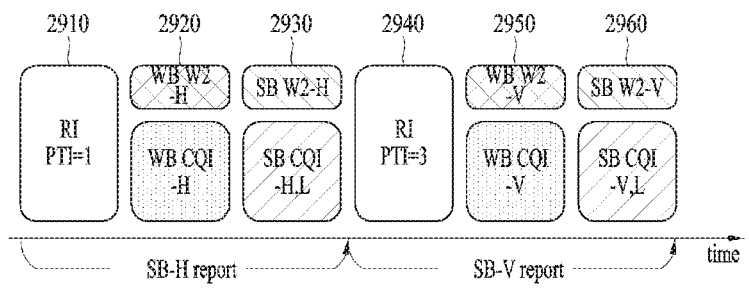
FIG. 29 is a diagram showing a method feeding back SB CSI in 3D beamforming based on a 2-bit indicator.

FIG. 29 is a diagram showing a method feeding back SB CSI in 3D beamforming based on a 2-bit indicator. Equally to FIG. 28, in feedback of WB-H, WB-V, SB-H and SB-V, an RI and different precoding indicators (or indices for identifying arbitrary CSI feedback information) may be transmitted in first subframes 2810 and 2840 of the information, thereby identifying the type of the feedback information. At this time, unlike FIG. 24, if the UE feeds back SB CSI, the UE may include a subframe in information in a process of feeding back SB-H and SB-V. At this time, for example, the feedback period of the CSI may be set in units of a subframe in which the RI and the precoding indicator are included.

In FIGS. 28 and 29, since the subframe including the RI and the precoding indicator is necessary in the first subframe of the information, a feedback time may increase. However, the UE may distinguishably feed back CSI for the horizontal domain and the vertical domain, thereby improving CSI feedback accuracy.

The other configurations are equal to the configurations described with reference to FIGS. 23 to 27, except for the value indicated by the number of bits of the precoding indicator.

Figure 30:
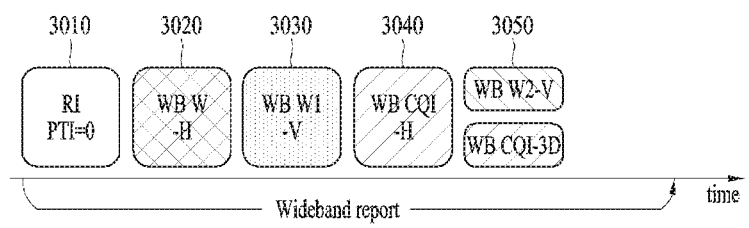
FIG. 30 is a diagram showing a method of feeding back CSI based on a PMI structure in 3D beamforming.

FIG. 30 is a diagram showing a method of feeding back CSI based on a PMI structure in 3D beamforming. The PMI may be configured based on a single codebook or a dual codebook. At this time, for example, any one of the PMIs for the horizontal and vertical domains is configured based on the single codebook and the other PMI is configured based on the dual codebook. At this time, if the precoding indicator is a first value, the UE may feed back WB CSI for the horizontal and vertical domains. At this time, for example, referring to FIG. 30, the PMI for the horizontal domain may be based on the single codebook. At this time, a first subframe 3010 may include information on an RI and a precoding indicator. In addition, a second subframe 3020 may include WB W-H for the horizontal domain. At this time, the horizontal domain is based on the single codebook and thus only one WB W-H may be fed back. In addition, in a third subframe 3030, WB W1-V for the vertical domain may be fed back. At this time, the vertical domain is based on the dual codebook and thus WB W1-V may be fed back. In addition, in a fourth subframe 3040, only WB CQI-H may be fed back. That is, the horizontal domain is based on the single codebook and is already fed back in the second subframe 3020. Therefore, there is no PMI to be fed back. Accordingly, the UE may feed back only CQI information for the horizontal domain. At this time, for example, the fourth subframe 3040 does not include the existing WB W2-H and thus may include additional information, without being limited to the above-described embodiment.

In addition, WB W2-V and WB CQI-3D may be fed back in a fifth subframe 3050. That is, the vertical domain is based on the dual codebook and thus WB W2-V may be fed back in the fifth subframe 3050. In addition, the above-described configuration is equally applicable to the case where the vertical domain is based on the single codebook and the horizontal domain is based on the dual codebook, without being limited to the above-described embodiment.

Figure 31:
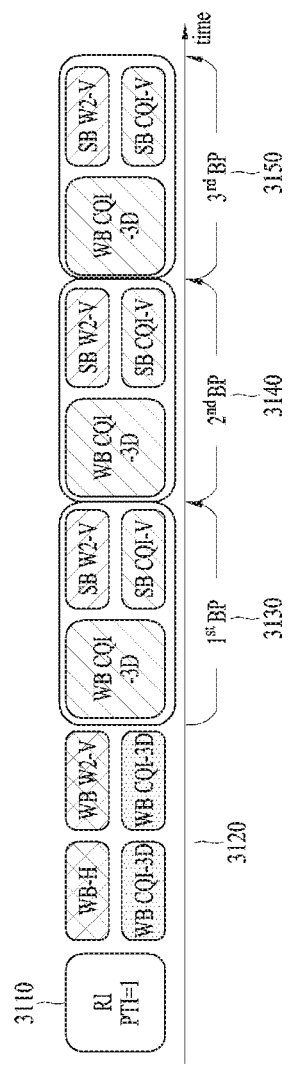
FIG. 31 is a diagram showing a method of feeding back CSI based on a PMI structure in 3D beamforming.

FIG. 31 is a diagram showing a method of feeding back CSI based on a PMI structure in 3D beamforming. At this time, similarly to FIG. 30, any one of the PMIs for the horizontal and vertical domains is configured based on the single codebook and the other PMI is configured based on the dual codebook. At this time, if the precoding indicator is a second value, the UE may feed back SB CSI for the horizontal and vertical domains. At this time, for example, referring to FIG. 31, the PMI for the horizontal domain may be based on the single codebook. At this time, for example, SB CSI feedback may be performed in bandwidth part units as shown in FIG. 27. FIG. 31 is described through comparison with FIG. 27 but is applicable to FIG. 26 using the same method.

At this time, a first subframe 3110 may include information on an RI and a precoding indicator. At this time, WB-H, WB CQI-3D, WB W2-V and WB CQI-3D information may be fed back in second and third subframes. At this time, the horizontal domain is based on the single codebook and thus only one WB W-H may be fed back. Accordingly, as a first bandwidth part 3330, a fourth subframe may include only WB CQI-3D. That is, the horizontal domain is based on the single codebook and thus feedback of SB W2-H may not be necessary. In addition, even in the case of the CQI information, SB W2-H is not fed back and only WB CQI-3D may be fed back. In contrast, SB W2-V may be fed back in a fifth subframe. The above-described configuration is equally applicable to a second bandwidth part 3340 and a third bandwidth part 3350, without being limited to the above-described embodiment.

Figure 32:
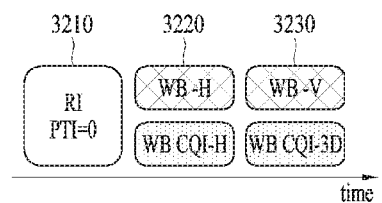
FIG. 32 is a diagram showing a method of feeding back CSI based on a PMI structure in 3D beamforming.

FIG. 32 is a diagram showing a method of feeding back CSI based on a PMI structure in 3D beamforming. The horizontal domain and the vertical domain may be based on a single codebook. At this time, referring to FIG. 32, the UE may not feed back SB CSI for the horizontal domain and the vertical domain. Accordingly, the UE may feed back information on an RI and a precoding indicator in a first subframe 3210 and feed back WB-H and WB CQI-H in a second subframe 3220. In addition, the UE may feed back WB-V and WB CQI-3D in a third subframe 3230. That is, the UE may feed back only WB-H and WB-V. At this time, for example, the PMI feedback order for the horizontal domain and the vertical domain may be changed, as described above.

Figure 33:
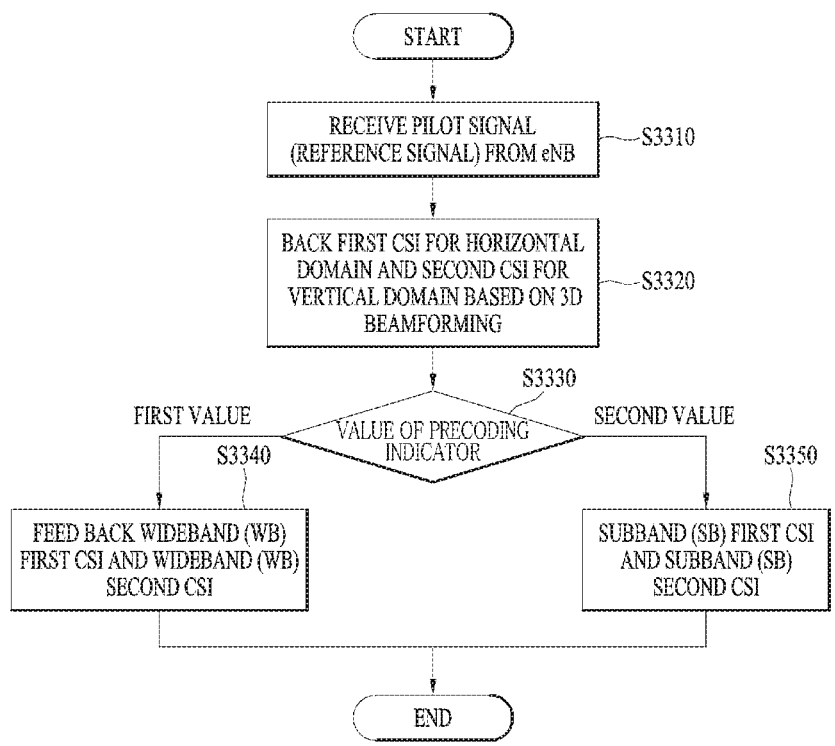
FIG. 33 is a flowchart illustrating an embodiment of the present invention.

FIG. 33 is a flowchart illustrating an embodiment of the present invention.

The UE may receive a pilot signal from the eNB (S3310). At this time, in FIGS. 16 to 20, as described above, the pilot signal for configured antenna arrays may be received based on QCL per pilot pattern.

Next, the UE may feed back first CSI for the horizontal domain and second CSI for the vertical beamforming based on 3D beamforming (S3320). At this time, in FIGS. 21 to 32, as described above, the CSI may include RI, PMI and CQI information. At this time, for example, the PMI may be configured based on a dual codebook or a single codebook.

Next, the UE may determine the fed-back CSI based on a precoding indicator value (SS330). At this time, if the precoding indicator is a first value, the UE may feed back WB first CSI and WB second CSI (S3340). In addition, if the precoding indicator is a second value, the UE may feed back SB first CSI and SB second CSI (S3350). At this time, in FIGS. 23 to 32, as described above, the UE may feed back CSI for the horizontal domain and the vertical domain. At this time, for example, the UE may divide the feedback mode of the CSI based on the precoding indicator. At this time, the precoding indicator may be a precoding type indicator (PTI). In addition, for example, the precoding indicator may be information indicated through another field. That is, the precoding indicator may be an indicator or field indicating a method of feeding back CSI for the horizontal domain and the vertical domain in a 3D beamforming environment, without being limited to the above-described embodiment.

In addition, for example, the precoding indicator may have 1 bit. That is, the precoding indicator may have a value of 0 or 1. As another example, the precoding indicator may have 2 bits. That is, the precoding indicator may have a value of 0, 1, 2 or 3, which will be described below. In addition, the precoding indicator may include information based on more bits as multiple bits, without being limited to the above-described embodiment.

For example, if the precoding indicator indicates a first value, the UE may feed back wideband (WB) first CSI and wideband second CSI. That is, if the precoding indicator indicates a first value, the UE may feed back wideband (WB) CSI for each of the horizontal domain and the vertical domain. As another example, if the precoding indicator indicates a second value, the UE may feed back subband (SB) first CSI and subband (SB) second CSI. That is, if the precoding indicator indicates a second value, the UE may feed back subband CSI for each of the horizontal domain and the vertical domain. At this time, for example, the precoding indicator may have 1 bit. At this time, if the first value is 0, the second value may be 1. In contrast, if the first value is 1, the second value may be 0. At this time, wideband CSI may be CSI for a wide frequency band. In addition, subband CSI may be CSI for a narrow frequency band. For example, the UE may feed back only CSI for a preferred subband to the eNB.

In addition, for example, the UE may be configured to perform WB CSI feedback earlier than SB CSI feedback. More specifically, the PMI may be fed back in a dual structure based on a codebook. That is, the UE may feed back W1 and W2 to the eNB as a PMI having a dual structure. The eNB may find W as a final PMI using the fed-back W1 and W2. At this time, the eNB requires a predetermined time until W1 and W2 for WB and SB are fed back, in order to find the final W of SB. At this time, the eNB cannot find accurate SB CSI during a feedback time delay period. Accordingly, the UE preferentially feeds back WB CSI and then feeds back SB CSI, thereby decreasing channel estimation errors. For example, in order to for the UE to feed back the CSI for the preferred SB, the WB CSI may be preferentially fed back and then the CSI for a preferred band may be fed back. At this time, the eNB may immediately find the final W through W1 of the WB CSI and the W2 of the SB CSI when the SB CSI is received.

In addition, in an environment, to which 3D beamforming is applied, the feedback information of CSI may be variously configured. At this time, for example, the PMI may be fed back in a dual structure based on a codebook as described above.

Figure 34:
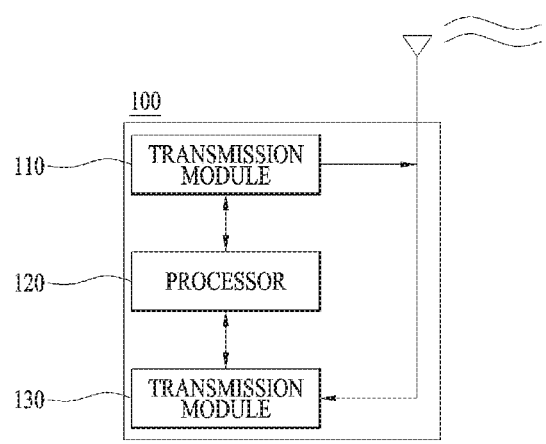
FIG. 34 is a block diagram of a UE device according to an embodiment of the present invention.

FIG. 34 is a block diagram of a UE device according to an embodiment of the present invention.

A UE device may feed back CSI.

At this time, the UE device 100 may include a transmission module 110 for transmitting a radio signal, a reception module 130 for receiving a radio signal, and a processor 120 for controlling the transmission module 110 and the reception module 130. At this time, the UE device 100 may perform communication with an external device using the transmission module 110 and the reception module 130. At this time, the external device may be another UE device. In addition, the external device may be an eNB. That is, the external device may be a device capable of performing communication with the UE device 100, without being limited to the above-embodiment. The UE device may transmit and receive digital data such as content using the transmission module 110 and the reception module 130. That is, the UE device 100 may perform communication using the transmission module 110 and the reception module 130 to exchange information with the external device.

According to one embodiment of the present invention, the processor 120 of the UE device may receive a pilot signal (reference signal) from the eNB using the reception module 130 in a wireless communication system, to which 3D beamforming is applied. Thereafter, the processor 120 may feed back first CSI for the horizontal domain and second CSI for the vertical domain based on 3D beamforming using the transmission module 110. At this time, if the precoding indicator is a first value, wideband (WB) first CSI and wideband (WB) second CSI may be fed back and, if the precoding indicator is a second value, subband (SB) first CSI and first subband (SB) first CSI may be fed back. At this time, for example, WB first CSI and WB second CSI may be fed back earlier than the SB first CSI and SB second CSI. In addition, for example, the precoding indicator may have 1 bit or 2 bits. In addition, for example, the CSI may include a vertical (V)-PMI and a horizontal (H)-PMI, and V-PMI and H-PMI may be configured based on a single codebook and a dual codebook. At this time, if the precoding indicator is a first value, WB first V-PMI (WB W1-V) and WB first H-PMI (WB W1-H) may be fed back in a first subframe and WB second V-PMI (WB W2-V) and WB second H-PMI (WB W2-H) may be sequentially fed back in a second subframe and a third subframe. At this time, the first subframe, the second subframe and the third subframe may be consecutive or inconsecutive in terms of time. In addition, for example, the feedback periods of the precoding indicator, WB W1-V, WB W1-H, WB W2-V and WB W2-H may be differently set.

In addition, for example, if the precoding indicator is a first value, WB first V-PMI (WB W1-V) and WB first H-PMI (WB W1-H) may be sequentially fed back in the first subframe and the second subframe and WB second H-PMI (WB W2-H) and WB second V-PMI (WB W2-V) may be fed back along with the CQI corresponding to each subframe in the third subframe and the fourth subframe. In addition, if the precoding indicator is a second value, SB first CSI for the horizontal domain may be fed back in a first part and SB second CSI for the vertical domain may be fed back in a second part. At this time, the first part and the second part may be divided in terms of time. In addition, for example, if the precoding indicator is a second value, the CSI may be sequentially fed back per bandwidth part. At this time, the bandwidth part may include two subframes respectively including SB first CSI and SB second CSI. In addition, for example, the CSI may include a vertical (V)-PMI and a horizontal (H)-PMI. At this time, at least one of the V-PMI and the H-PMI may be configured based on a single codebook. At this time, if any one of the V-PMI and the H-PMI may be configured based on a single codebook and the precoding indicator is a second value, SB PMI feedback for the PMI configured based on the single codebook may be omitted. In addition, for example, the V-PMI and the H-PMI are configured based on the single codebook and the precoding indicator is a second value, SB PMI feedback for the V-PMI and the H-PMI may be omitted. In addition, for example, if the precoding indicator has 2 bits, the first value of the precoding indicator may include a 1-H value indicating that WB first CSI is fed back and a 1-V value indicating that WB second CSI is fed back and the second value of the precoding indicator may include a 2-H value indicating that SB first CSI is fed back and a 2-V value indicating that SB second CSI is fed back, as described above.

The embodiments of the present invention can be implemented by a variety of means, for example, hardware, firmware, software, or a combination thereof.

In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both apparatus and method inventions may be complementarily applied to each other.

INDUSTRIAL APPLICABILITY

Although an example of applying a method of configuring a reference signal for three-dimensional (3D) MIMO and a device therefor in a wireless communication system to a 3GPP LTE system is described, the present invention is applicable to various wireless communication systems in addition to the 3GPP LTE system.

What is claimed is:
1. A method of feeding back channel state information (CSI) in a wireless communication system applied three-dimensional (3D) beamforming, the method performed by a user equipment (UE) and comprising:
receiving a reference signal from a base station; and
feeding back first CSI for a horizontal (H) domain and second CSI for a vertical (V) domain based on the 3D beamforming,
wherein the first CSI comprises wideband (WB) first CSI and the second CSI comprises WB second CSI when a precoding indicator is a first value,
wherein the first CSI comprises subband (SB) first CSI and the second CSI comprises SB second CSI when the precoding indicator is a second value,
wherein the WB first CSI includes WB H-channel quality information (CQI) and the WB second CSI includes WB V-CQI,
wherein the first CSI includes an H-precoding matrix index (PMI) and the second CSI includes a V-PMI, when one of the V-PMI and the H-PMI is configured based on a single codebook and another one of the V-PMI and the H-PMI is configured based on a dual codebook:
wherein a SB PMI feedback for the one of the V-PMI and the H-PMI configured based on the single codebook is omitted and WB PMI feedback for the one of the V-PMI and the H-PMI configured based on the single codebook is performed, and
wherein a SB PMI feedback for the another one of the V-PMI and the H-PMI configured based on the dual codebook is performed and a first WB PMI feedback and a second WB PMI feedback for the another one of the V-PMI and the H-PMI configured based on the dual codebook are performed.

2. The method according to claim 1, wherein the WB first CSI and the WB second CSI are fed back earlier than the SB first CSI and the SB second CSI.

3. The method according to claim 1, wherein the precoding indicator has 1 bit.

4. The method according to claim 1, wherein the first WB PMI feedback and the WB PMI feedback are performed in a first subframe when the precoding indicator is the first value,
wherein the second WB PMI feedback is sequentially performed in a second subframe.

5. The method according to claim 4, wherein the first subframe and the second subframe are consecutive in time.

6. The method according to claim 4, wherein feedback periods of the precoding indicator, the first WB PMI feedback, the second WB PMI feedback, and the WB PMI feedback are set differently.

7. The method according to claim 1, when the precoding indicator is the first value, wherein:
the first WB PMI feedback is performed in a first subframe,
the WB PMI feedback is performed sequentially in a second subframe,
one of the WB H-CQI and the WB V-CQI configured based on the single codebook is sequentially fed back in a third subframe, and
the second WB PMI is sequentially fed back with another one of the WB H-CQI and the WB V-CQI configured based on the dual codebook in a fourth subframe.

8. A user equipment (UE) device for feeding back channel state information (CSI) in a wireless communication system applied three-dimensional (3D) beamforming, the UE device comprising:
a receiver configured to receive information from an external device;
a transmitter configured to transmit information to the external device; and
a processor configured to:
control the receiver to receive a reference signal from a base station; and
control the transmitter to feedback first CSI for a horizontal (H) domain and second CSI for a vertical (V) domain based on the 3D beamforming,
wherein the first CSI comprises wideband (WB) first CSI and the second CSI comprises WB second CSI when a precoding indicator is a first value,
wherein the WB first CSI includes WB H-channel quality information (CQI) and the WB second CSI includes WB V-CQI,
wherein the first CSI includes an H-precoding matrix index (PMI) and the second CSI includes a V-PMI,
when one of the V-PMI and the H-PMI is configured based on a single codebook and another one of the V-PMI and the H-PMI is configured based on a dual codebook:
wherein a SB PMI feedback for the one of the V-PMI and the H-PMI configured based on the single codebook is omitted and WB PMI feedback for the one of the V-PMI and the H-PMI configured based on the single codebook is performed, and
wherein a SB PMI feedback for the another one of the V-PMI and the H-PMI configured based on the dual codebook is performed and a first WB PMI feedback and a second WB PMI feedback for the another one of the V-PMI and the H-PMI configured based on the dual codebook are performed.

9. The UE device according to claim 8, wherein the WB first CSI and the WB second CSI are fed back earlier than the SB first CSI and the SB second CSI.

10. The UE device according to claim 8, wherein the precoding indicator has 1 bit.

* * * * *